United States Patent
Kondo

(10) Patent No.: US 12,443,092 B2
(45) Date of Patent: Oct. 14, 2025

(54) LENS DEVICE

(71) Applicant: FUJIFILM Corporation, Tokyo (JP)

(72) Inventor: Nobuyuki Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 507 days.

(21) Appl. No.: 17/935,859

(22) Filed: Sep. 27, 2022

(65) Prior Publication Data

US 2023/0140724 A1    May 4, 2023

(30) Foreign Application Priority Data

Oct. 29, 2021    (JP) .................. 2021-177663

(51) Int. Cl.
*G03B 17/14*    (2021.01)
*G03B 5/00*    (2021.01)

(52) U.S. Cl.
CPC .............. G03B 17/14 (2013.01); G03B 5/00 (2013.01); *G03B 2205/0046* (2013.01)

(58) Field of Classification Search
CPC . G03B 17/14; G03B 5/00; G03B 5/10; G03B 2205/0046; G02B 7/02; G02B 7/04; G02B 7/09; G02B 7/10; G02B 7/102
USPC .................. 359/679, 696, 701, 704
See application file for complete search history.

(56) References Cited

U.S. PATENT DOCUMENTS

| | | |
|---|---|---|
| 2011/0176795 A1 | 7/2011 | Won et al. |
| 2013/0021687 A1 | 1/2013 | Santo et al. |
| 2014/0098278 A1 | 4/2014 | Koyama et al. |
| 2017/0351053 A1 | 12/2017 | Shinano et al. |
| 2021/0157091 A1 | 5/2021 | Yamazaki et al. |

FOREIGN PATENT DOCUMENTS

| | | | | |
|---|---|---|---|---|
| JP | H03-108964 A | | 5/1991 | |
| JP | H05-107442 A | | 4/1993 | |
| JP | 2005024670 A | * | 1/2005 | ............... G02B 7/10 |
| JP | 2014-77878 A | | 5/2014 | |
| JP | WO2016/143327 A1 | | 1/2018 | |
| WO | 2012/035778 A1 | | 3/2012 | |
| WO | 2020/031374 A1 | | 2/2020 | |

OTHER PUBLICATIONS

Terada H, JP-2005024670-A, machine English language translation (Year: 2005).*
"Notice of Reasons for Refusal" Office Action issued in JP 2021-177663; mailed by the Japanese Patent Office on Mar. 3, 2025.

* cited by examiner

*Primary Examiner* — Marin Pichler
(74) *Attorney, Agent, or Firm* — Studebaker Brackett PLLC

(57) ABSTRACT

A lens device includes a lens barrel, a first operation ring that is provided on an outer periphery of the lens barrel and that is rotationally operated along a circumferential direction of the lens barrel, and a structure that generates, with respect to the first operation ring, a force in a direction opposite to a direction in which the first operation ring is operated, in which the first operation ring and the structure are disposed closer to an image side than a position of a stop disposed in the lens barrel.

19 Claims, 16 Drawing Sheets

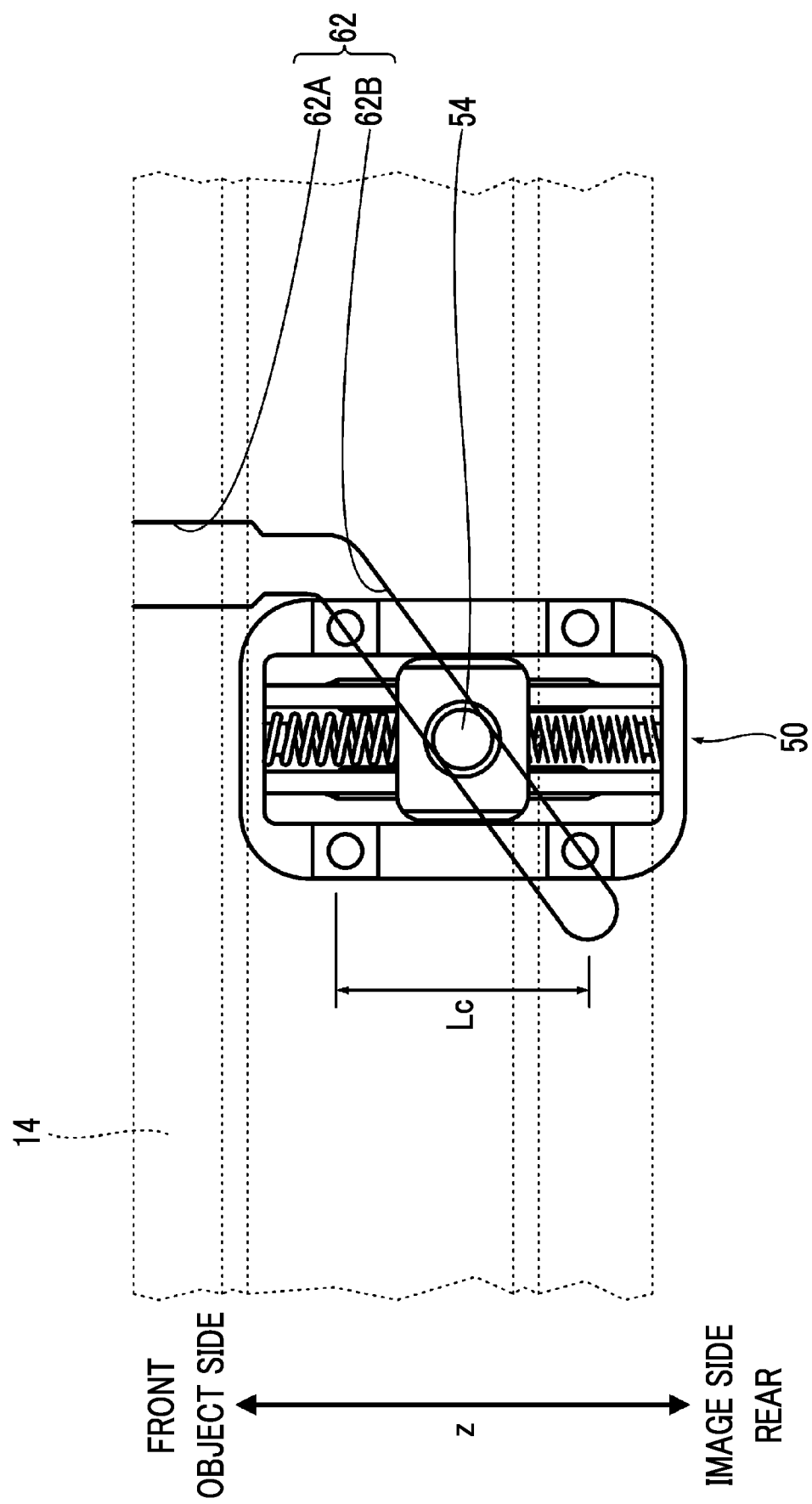

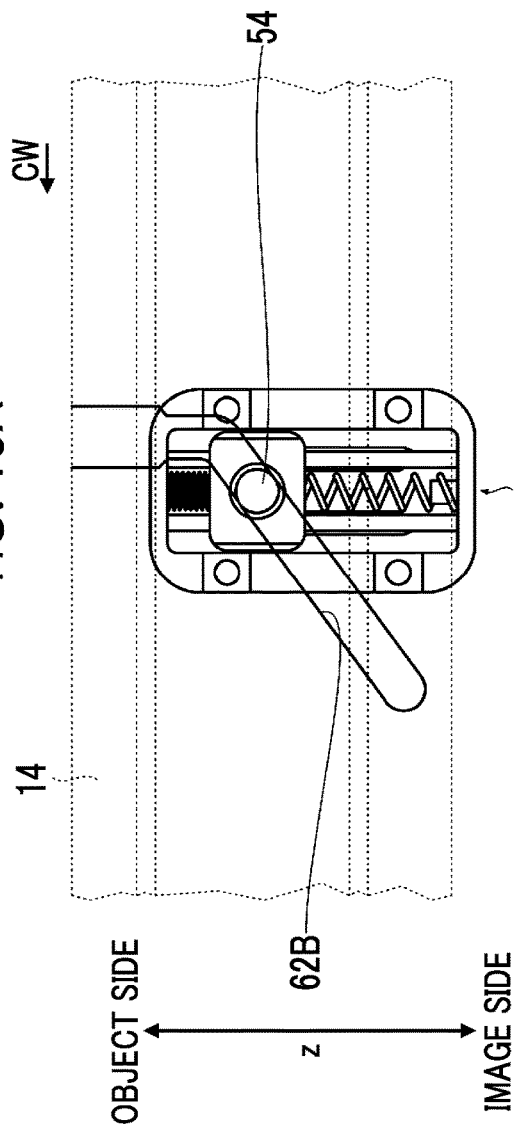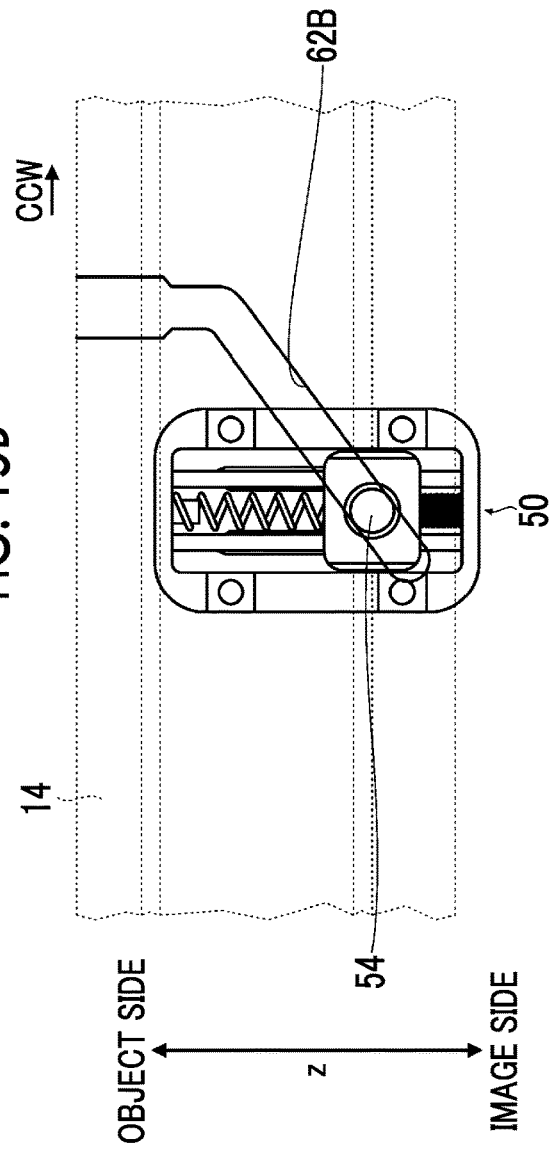

LENS DEVICE

CROSS-REFERENCE TO RELATED APPLICATIONS

The present application claims priority under 35 U.S.C. § 119 to Japanese Patent Application No. 2021-177663 filed on Oct. 29, 2021. Each of the above application is hereby expressly incorporated by reference, in its entirety, into the present application.

BACKGROUND OF THE INVENTION

1. Field of the Invention

The present invention relates to a lens device.

2. Description of the Related Art

Described in WO2012/035778A is a lens device including a zoom ring and a zoom lever. In WO2012/035778A, the zoom lever is composed of an arc-shaped member and is slid along a circumferential direction of a lens barrel. In addition, in WO2012/035778A, the zoom lever is used to quickly change the focal length of an optical system.

Described in JP2014-77878A is a lens device including an operation ring and a zoom lever. In JP2014-77878A, the zoom lever is composed of an arc-shaped member and is slid along the circumferential direction of a lens barrel. In addition, in JP2014-77878A, the zoom lever is used for an operation of changing a magnification at a certain speed.

Described in JP1991-108964A (JP-H03-108964A) are a lens device including an electric zoom mechanism and performing a zooming operation by using a ring-shaped electric zoom switch provided at an outer periphery of a lens barrel.

SUMMARY OF THE INVENTION

According to an embodiment of the present disclosed technology, there is provided a small-size lens device including an operation ring.

(1) A lens device including a lens barrel, a first operation ring that is provided on an outer periphery of the lens barrel and that is rotationally operated along a circumferential direction of the lens barrel, and a structure that generates, with respect to the first operation ring, a force in a direction opposite to a direction in which the first operation ring is operated, in which the first operation ring and the structure are disposed closer to an image side than a position of a stop disposed in the lens barrel.

(2) The lens device according to (1), in which the first operation ring is rotationally operated within a specific angular range.

(3) The lens device according to (1) or (2), in which the structure causes the first operation ring to automatically return to a specific position.

(4) The lens device according to any one of (1) to (3), in which the structure is disposed at a plurality of positions in the circumferential direction.

(5) The lens device of (4), in which the force of the structure that acts on the first operation ring is adjustable at at least one position.

(6) The lens device according to any one of (1) to (5), in which the structure is disposed between the lens barrel and the first operation ring.

(7) The lens device according to any one of (1) to (6), in which the structure includes a cam pin that is supported to be movable along an optical axis direction and a spring that biases the cam pin in the optical axis direction, and the cam pin is fitted into a cam groove, the cam groove being provided at the first operation ring.

(8) The lens device according to (7), in which the structure includes at least a pair of springs that biases the cam pin in opposite directions with the cam pin interposed between the springs.

(9) The lens device according to (7) or (8), in which the structure includes a base member that is attachably and detachably attached to the lens barrel, the cam pin is movably supported by the base member, and the spring is held at the base member.

(10) The lens device according to any one of (1) to (9), in which the structure is disposed radially outside a lens that is disposed closer to the image side than the position of the stop, and the structure is disposed radially inside the first operation ring.

(11) The lens device according to any one of (1) to (10), in which the lens barrel includes a first lens barrel that holds a lens, and a second lens barrel that holds the first lens barrel, and the first operation ring and the structure are provided on the second lens barrel.

(12) The lens device according to any one of (1) to (8), in which the lens barrel includes a plurality of operation rings including the first operation ring on the outer periphery of the lens barrel, at least one of a zoom ring, a focus ring, or a stop ring is provided as the operation ring other than the first operation ring, and the first operation ring has a smallest diameter out of the plurality of operation rings.

(13) The lens device according to (12), in which the first operation ring is disposed closest to the image side out of the plurality of operation rings.

(14) The lens device according to any one of (1) to (13), in which the lens barrel includes a first projecting portion that is arc-shaped and that extends along the circumferential direction on at least a portion of the outer periphery of the lens barrel, and the first operation ring is disposed to be adjacent to the first projecting portion.

(15) The lens device according to (14), in which a height of the first projecting portion of the lens barrel in an outer diameter direction of the lens barrel is relatively larger than a height of the first operation ring.

(16) The lens device according to (14) or (15), in which the first projecting portion includes an operation member for settings related to the first operation ring and is disposed closer to the image side than the first operation ring.

(17) The lens device according to any one of (1) to (16), in which the first operation ring includes a second projecting portion that is arc-shaped and that extends along the circumferential direction on at least a portion of the outer periphery of the first operation ring.

(18) The lens device according to (17), in which the first operation ring includes the second projecting portion that is arc-shaped and that extends along the circumferential direction on a portion of the outer periphery of the first operation ring, and the second projecting portion is disposed at a position different from a position of the structure in the circumferential direction.

(19) The lens device according to any one of (1) to (18), in which the first operation ring is used for an operation related to zooming.

(20) The lens device according to any one of (1) to (19), further including a mount on an end portion of the lens barrel that is on the image side.

BRIEF DESCRIPTION OF THE DRAWINGS

FIG. 14 is a see-through view of a cam groove provided at the zoom lever ring.

FIGS. 15A and 15B are views showing a relationship between the operation of the zoom lever ring and movement of a cam pin.

DESCRIPTION OF THE PREFERRED EMBODIMENTS

Hereinafter, preferred embodiments of the present invention will be described in detail with reference to the attached drawings.

Here, a case where the present invention is applied to an interchangeable lens of an interchangeable lens camera will be described as an example. The interchangeable lens is an example of a lens device.

Configuration of Interchangeable Lens

External Configuration

Figure 1:
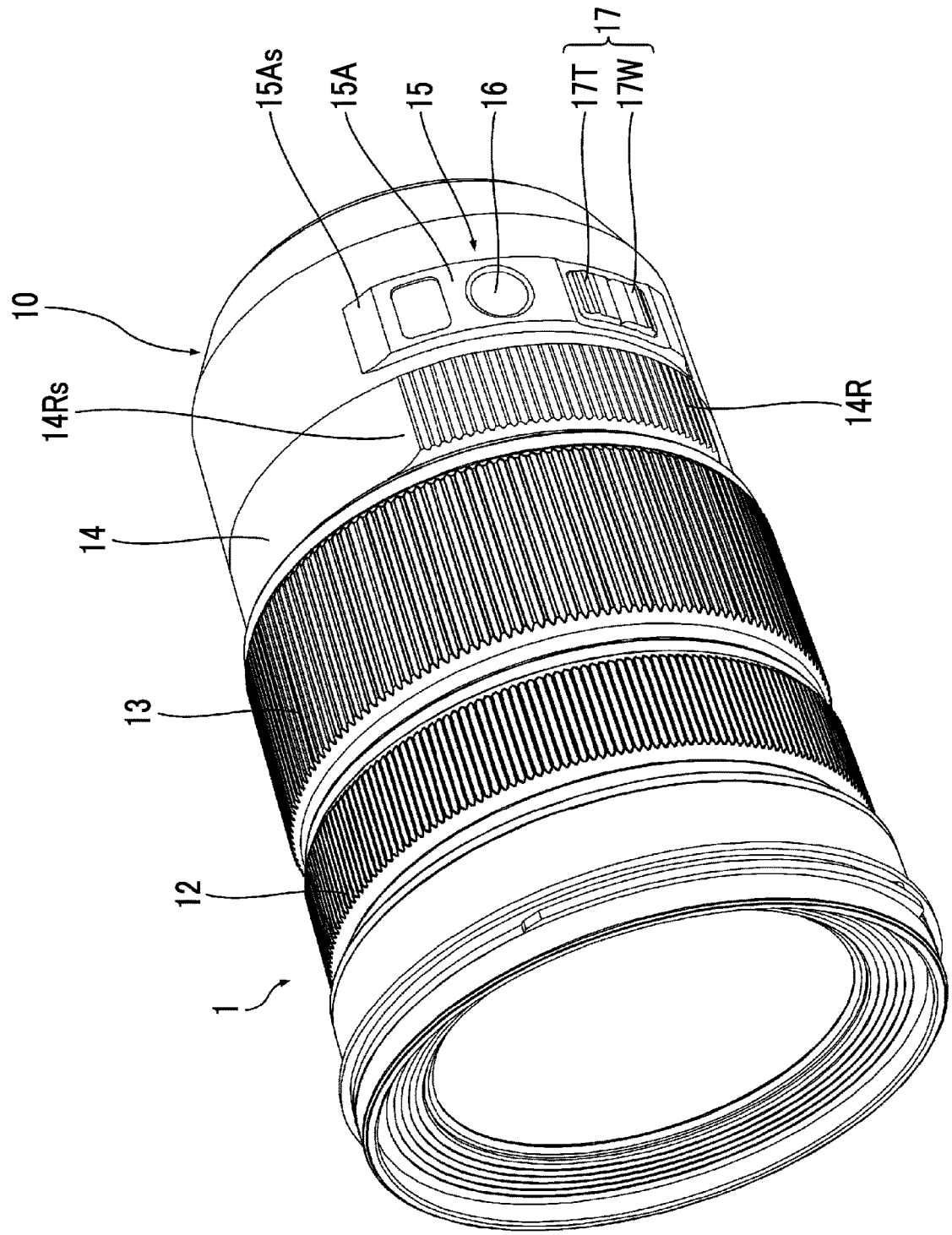
FIG. 1 is a front perspective view showing an external configuration of an interchangeable lens.
Figure 2:
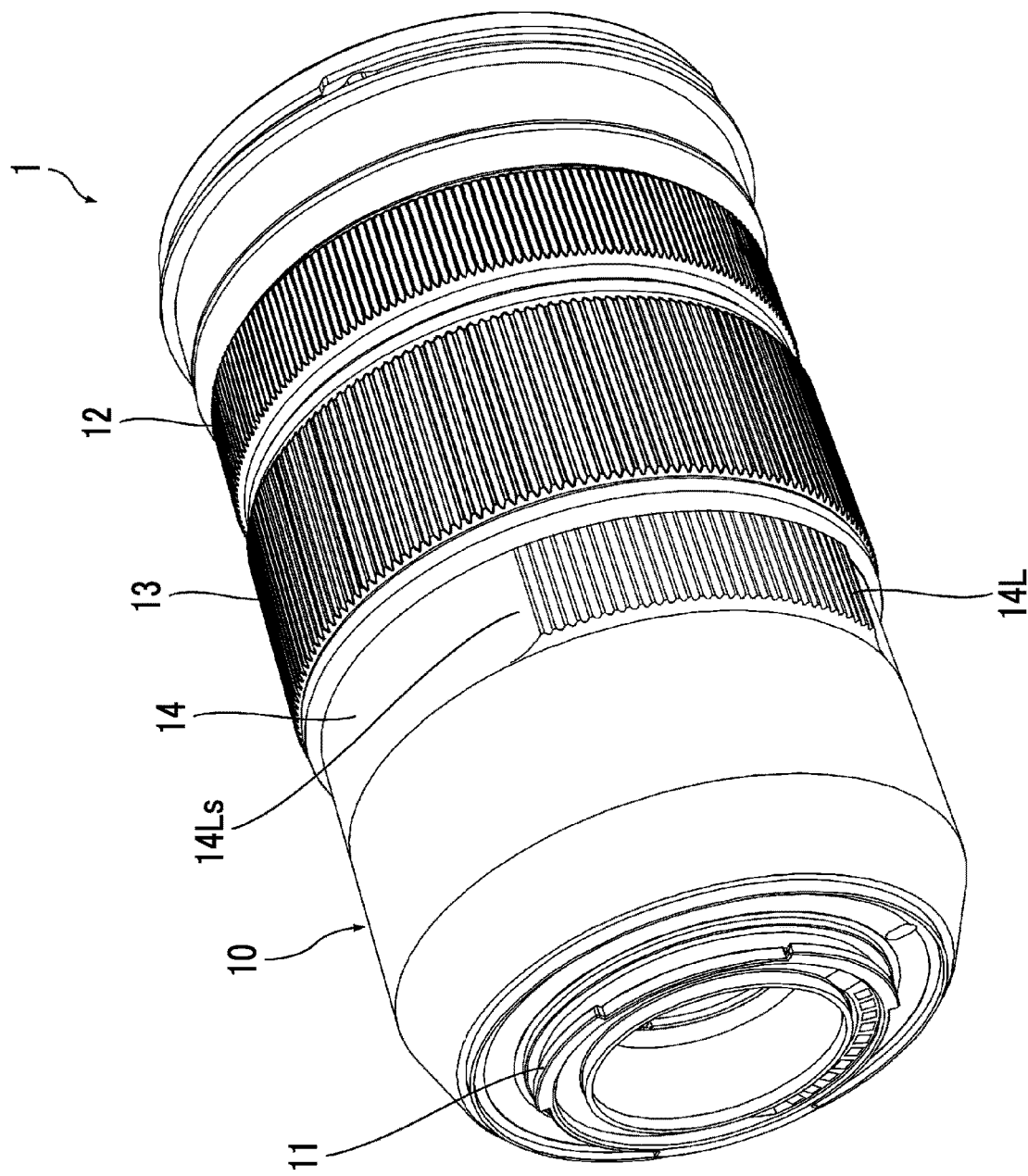
FIG. 2 is a rear perspective view showing the external configuration of the interchangeable lens.
Figure 3:
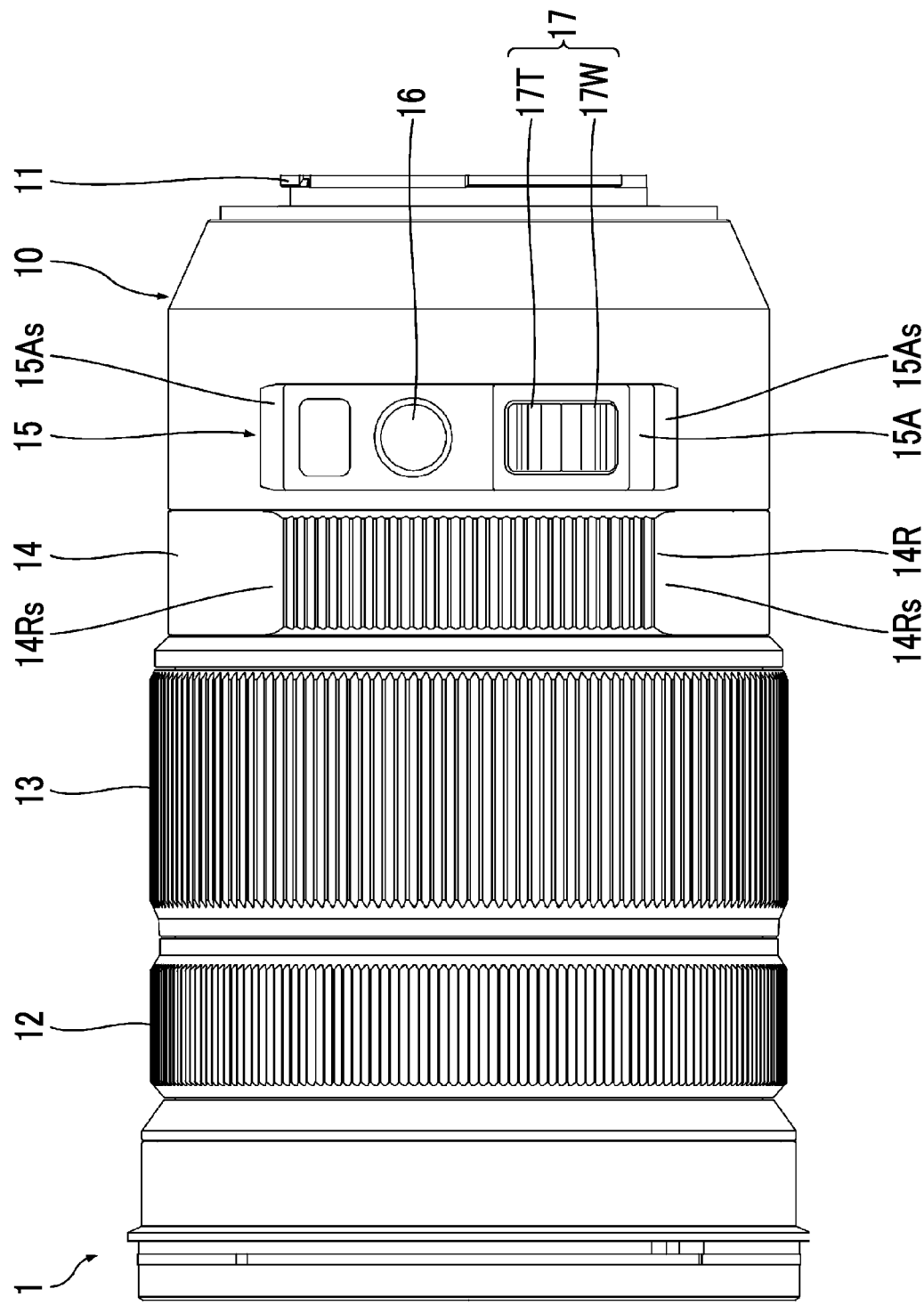
FIG. 3 is a right side view showing the external configuration of the interchangeable lens.
Figure 4:
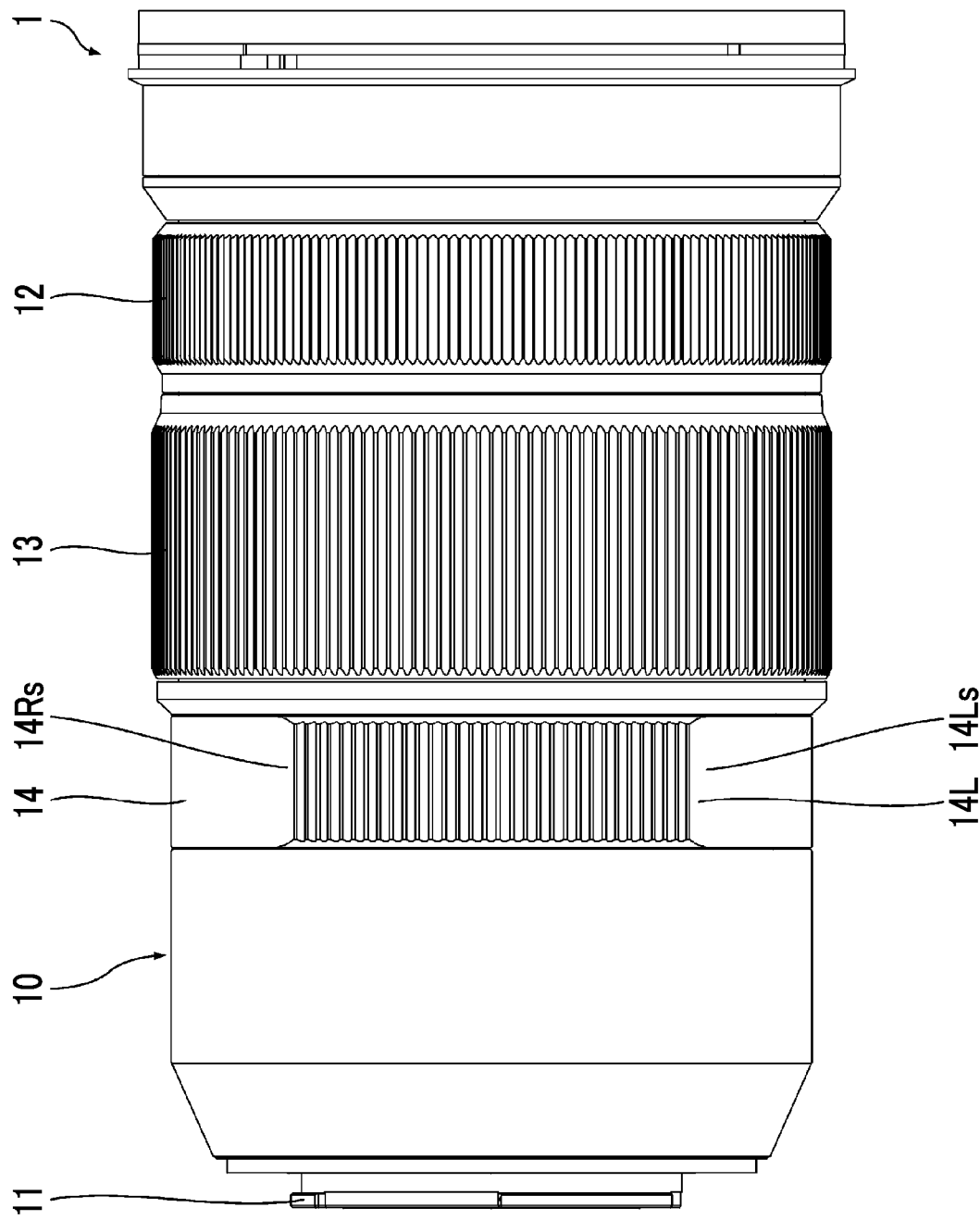
FIG. 4 is a left side view showing the external configuration of the interchangeable lens.
Figure 5:
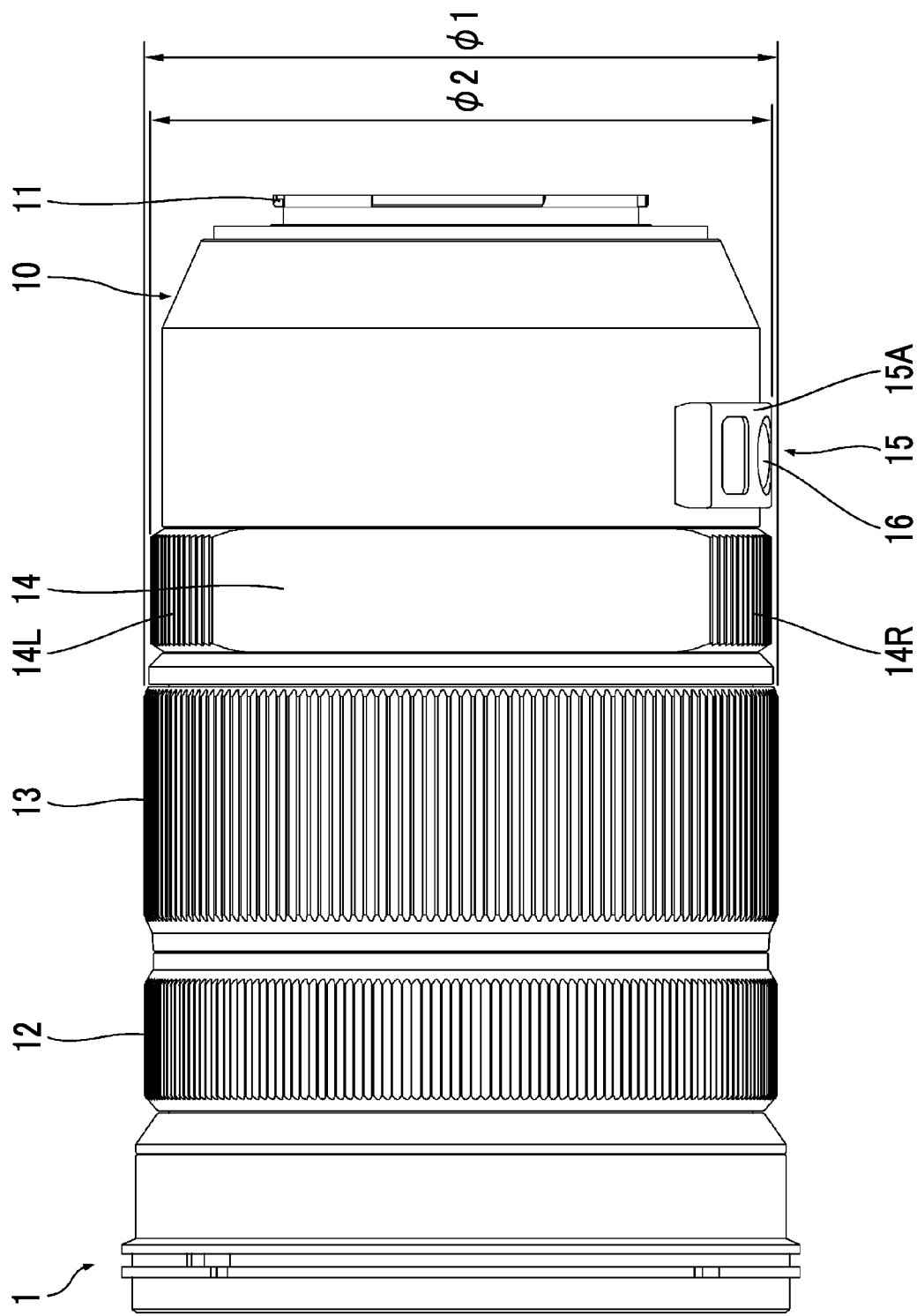
FIG. 5 is a plan view showing the external configuration of the interchangeable lens.
Figure 6:
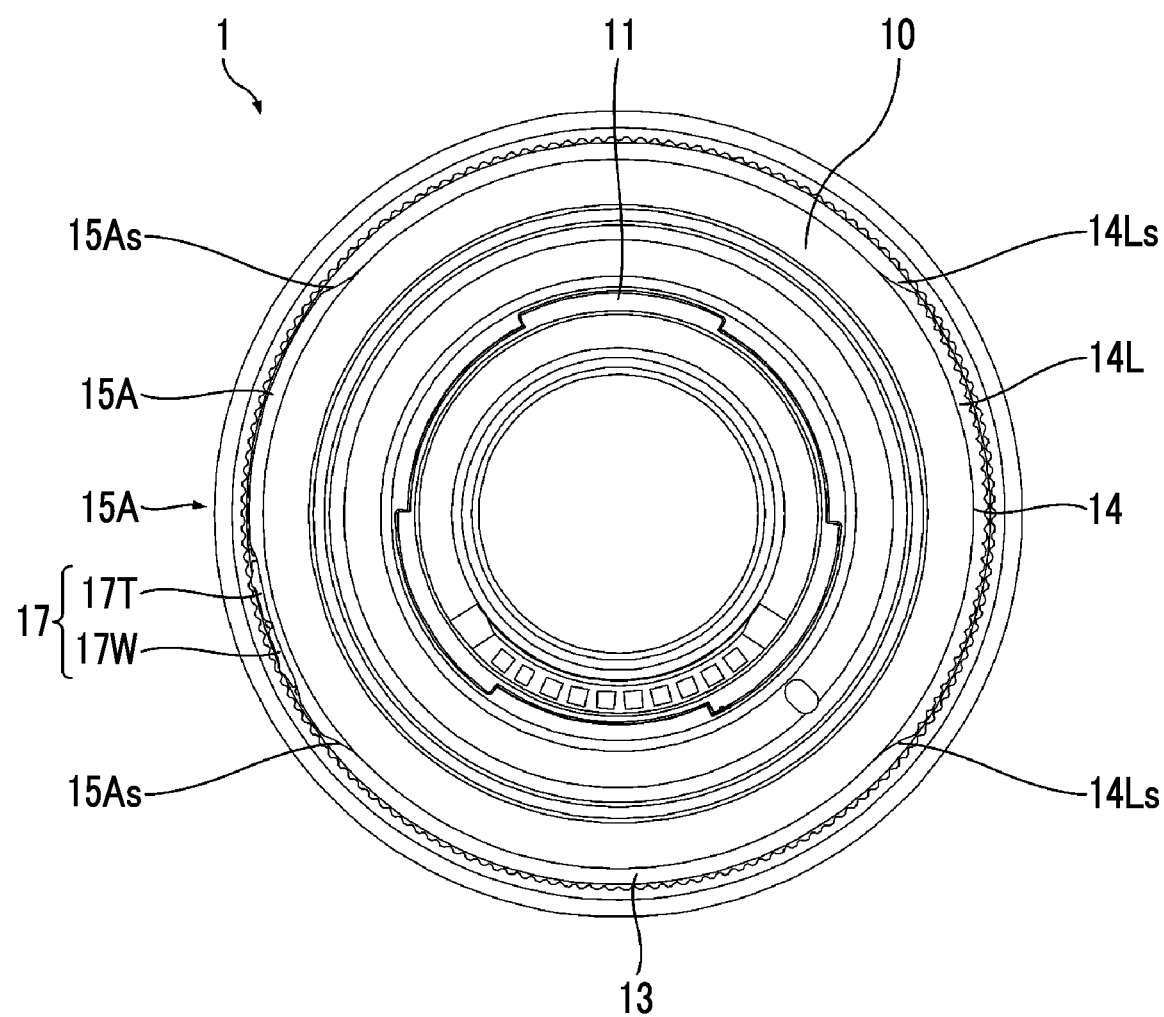
FIG. 6 is a rear view showing the external configuration of the interchangeable lens.

FIG. 1 is a front perspective view showing an external configuration of the interchangeable lens. FIG. 2 is a rear perspective view showing the external configuration of the interchangeable lens. FIG. 3 is a right side view showing the external configuration of the interchangeable lens. FIG. 4 is a left side view showing the external configuration of the interchangeable lens. FIG. 5 is a plan view showing the external configuration of the interchangeable lens. FIG. 6 is a rear view showing the external configuration of the interchangeable lens.

An interchangeable lens 1 of the present embodiment is a zoom lens, and particularly, a lens with a fixed total length. A lens with a fixed total length is a lens in which the total length of the interchangeable lens 1 is not changed by a zooming operation and a focusing operation.

In addition, the interchangeable lens 1 of the present embodiment is a zoom lens having an electric zooming (also referred to as power zoom) function. The electric zooming is a function of electrically zooming in response to a zooming operation performed by a user. In other words, the electric zooming is a function of zooming by moving a zoom lens group with a motor.

As shown in FIGS. 2 to 5, the interchangeable lens 1 includes a mount 11 at an end portion on a rear side (an image side (a right side in FIG. 3)) of a lens barrel 10 thereof. The interchangeable lens 1 is attachably and detachably mounted to a camera body via the mount 11. The standard of the mount is not particularly limited. For example, a bayonet mount is adopted in the present embodiment.

As shown in FIGS. 1 to 5, the interchangeable lens 1 includes a plurality of operation rings on an outer periphery of the lens barrel 10 thereof. The plurality of operation rings are composed of a focus ring 12, a zoom ring 13, and a zoom lever ring 14 in order from a front side (an object side (a left side in FIG. 3)).

The focus ring 12 is an operation member for a focusing operation that is rotated along a circumferential direction of the lens barrel 10. The focus ring 12 can be rotated forward and backward, and the direction of focusing is controlled in accordance with the direction of rotation of the focus ring 12. In addition, the focus ring 12 can be rotated without restriction, and the amount of movement of a focus (the amount of movement of a focal position) is controlled in accordance with the angle of rotation (the amount of rotation) of the focus ring 12. Knurling is performed on an outer periphery of the focus ring 12, so that a predetermined pattern of unevenness (for example, a straight knurl) is provided thereon.

The zoom ring 13 is an operation member for a zooming operation that is rotated along the circumferential direction of the lens barrel 10. The zoom ring 13 can be rotated forward and backward, and the direction of zooming is controlled in accordance with the direction of rotation of the zoom ring 13. In addition, the zoom ring 13 can be rotated without restriction, and the amount of zooming (the amount of change in angle of view or focal length) is controlled in accordance with the angle of rotation of the zoom ring 13. Knurling is performed on an outer periphery of the zoom ring 13, so that a predetermined pattern of unevenness (for example, a straight knurl) is provided thereon.

The zoom lever ring 14 is an operation member that is rotated within a specific angular range along the circumferential direction of the lens barrel 10. The zoom lever ring 14 is mainly used for a zooming operation. The zoom lever ring 14 can be rotated forward and backward with respect to a neutral point, and the direction of zooming is controlled in accordance with the direction of rotation of the zoom lever ring 14. In addition, the zoom lever ring 14 can be rotated within a specific angular range (for example, ±13°) with respect to the neutral point, and a zooming speed (the speed of change in angle of view) is controlled in accordance with the angle of rotation of the zoom lever ring 14. That is, the zoom lever ring 14 is used for variable-speed zooming. Details of the variable-speed zooming will be described later.

In addition, the zoom lever ring 14 has an automatic return function, and automatically returns to the neutral point in a case where the zoom lever ring 14 is released after being operated. The zoom lever ring 14 includes arc-shaped protrusion portions 14R and 14L extending in the circumferential direction at two positions on an outer periphery of the zoom lever ring 14. The two protrusion portions 14R and 14L function as grip portions in a case where the zoom lever ring 14 is to be operated, and are disposed to be bilaterally symmetrical. More specifically, the protrusion portions 14R and 14L are disposed to be bilaterally symmetrical with an optical axis interposed therebetween in a case where the interchangeable lens 1 is seen from a front side after the interchangeable lens 1 is mounted on the camera body. Knurling is performed on a peripheral surface of each of the protrusion portions 14R and 14L, so that a predetermined pattern of unevenness (for example, a straight knurl) is provided thereon. In addition, both of circumferential end portions of each of the protrusion portions 14R and 14L are composed of inclined surfaces 14Rs and 14Ls. In the present embodiment, the zoom lever ring 14 is an example of a first operation ring. In addition, the two protrusion portions 14R and 14L provided on the zoom lever ring 14 are an example of second projecting portions.

As shown in FIG. 5, regarding the three operation rings (the focus ring 12, the zoom ring 13, and the zoom lever ring 14) in the interchangeable lens 1 of the present embodiment, the zoom ring 13 has the largest width (the length in an optical axis direction) and the zoom lever ring 14 has the smallest width.

In addition, as shown in FIG. 5, regarding the three operation rings, the focus ring 12 and the zoom ring 13 have substantially the same outer diameter φ1 while the zoom lever ring 14 has an outer diameter φ2 smaller than the outer diameters of the focus ring 12 and the zoom ring 13. That is, the zoom lever ring 14 has the smallest outer diameter. Note that, the outer diameter of the zoom lever ring 14 here is the outer diameter including the protrusion portions 14R and 14L. That is, the outer diameter of the zoom lever ring 14 here is the outer diameter at a portion with the largest diameter.

Furthermore, as shown in FIG. 5, in the interchangeable lens 1 of the present embodiment, the zoom lever ring 14 among the three operation rings is disposed closest to a rear end side (the image side). The details of the disposition of the zoom lever ring 14 will be described later.

As shown in FIGS. 1 and 3, the interchangeable lens 1 includes a button operation unit 15 on a right portion of the outer periphery of the lens barrel 10 thereof. The button operation unit 15 includes an arc-shaped projecting portion 15A extending along the circumferential direction.

The projecting portion 15A is disposed closer to the image side than the zoom lever ring 14 and is disposed to be adjacent to the zoom lever ring 14. Particularly, in the interchangeable lens 1 of the present embodiment, as shown in FIG. 3, the projecting portion 15A is disposed to be adjacent to the protrusion portion 14R which is on one side (a right side in a front view) of the zoom lever ring 14 positioned at the neutral point.

As with the protrusion portions 14R and 14L of the zoom lever ring 14, both of circumferential end portions of the projecting portion 15A are composed of inclined surfaces 15As. In a state where the zoom lever ring 14 is positioned at the neutral point, the inclined surfaces 14Rs at both ends of the protrusion portion 14R on the one side of the zoom lever ring 14 are disposed in parallel with the inclined surfaces 15As at both ends of the projecting portion 15A. Accordingly, in a case where the zoom lever ring 14 is operated, it is possible to grasp the amount of operation of the zoom lever ring 14 from the amount of offset between the inclined surfaces 15As of the projecting portion 15A and the inclined surfaces 14Rs of the protrusion portion 14R. That is, since both of the inclined surfaces 14Rs and 15As are disposed in parallel, the amount of offset in the case of operation can be felt via fingers, and the amount of operation of the zoom lever ring 14 can be intuitively grasped without visual observation.

Not that, in the interchangeable lens 1 of the present embodiment, the height of the projecting portion 15A (the height in an outer diameter direction with respect to the optical axis) is relatively higher than the protrusion portion 14R of the zoom lever ring 14. Accordingly, in a case where the zoom lever ring 14 is operated with the protrusion portion 14R gripped, a finger comes into contact with the projecting portion 15A. As a result, it is possible to confirm that only the zoom lever ring 14 is being operated without visually confirming the position of the zoom lever ring 14. In the present embodiment, the projecting portion 15A of the button operation unit 15 is an example of a first projecting portion.

The button operation unit 15 includes a plurality of operation members on a peripheral surface of the projecting portion 15A. The plurality of operation members are composed of a switching button 16 and a zoom button 17.

The switching button 16 is composed of a circular push button. The switching button 16 is used to switch a function assigned to the zoom lever ring 14. In the case of the interchangeable lens 1, a function assigned to the zoom lever ring 14 is switched each time the switching button 16 is pressed. In the present embodiment, the switching button 16 is an example of an operation member for settings related to the first operation ring.

The zoom button 17 is composed of rounded rectangular push buttons and is configured to form a pair. Specifically, the zoom button 17 is composed of a zoom telephoto button 17T and a zoom wide-angle button 17W. The zoom telephoto button 17T and the zoom wide-angle button 17W are disposed to be arranged vertically along the circumferential direction. The zoom button 17 is an operation member for a zooming operation, and is used for constant-speed zooming. The constant-speed zooming is a function of zooming at a constant speed. The angle of view changes at a constant speed while the zoom button is pressed. In a case where the zoom telephoto button 17T is pressed, the zoom changes to a telephoto side at a constant speed. On the other hand, in a case where the zoom wide-angle button 17W is pressed, the zoom changes to a wide-angle side at a constant speed.

Internal Structure

Figure 7:
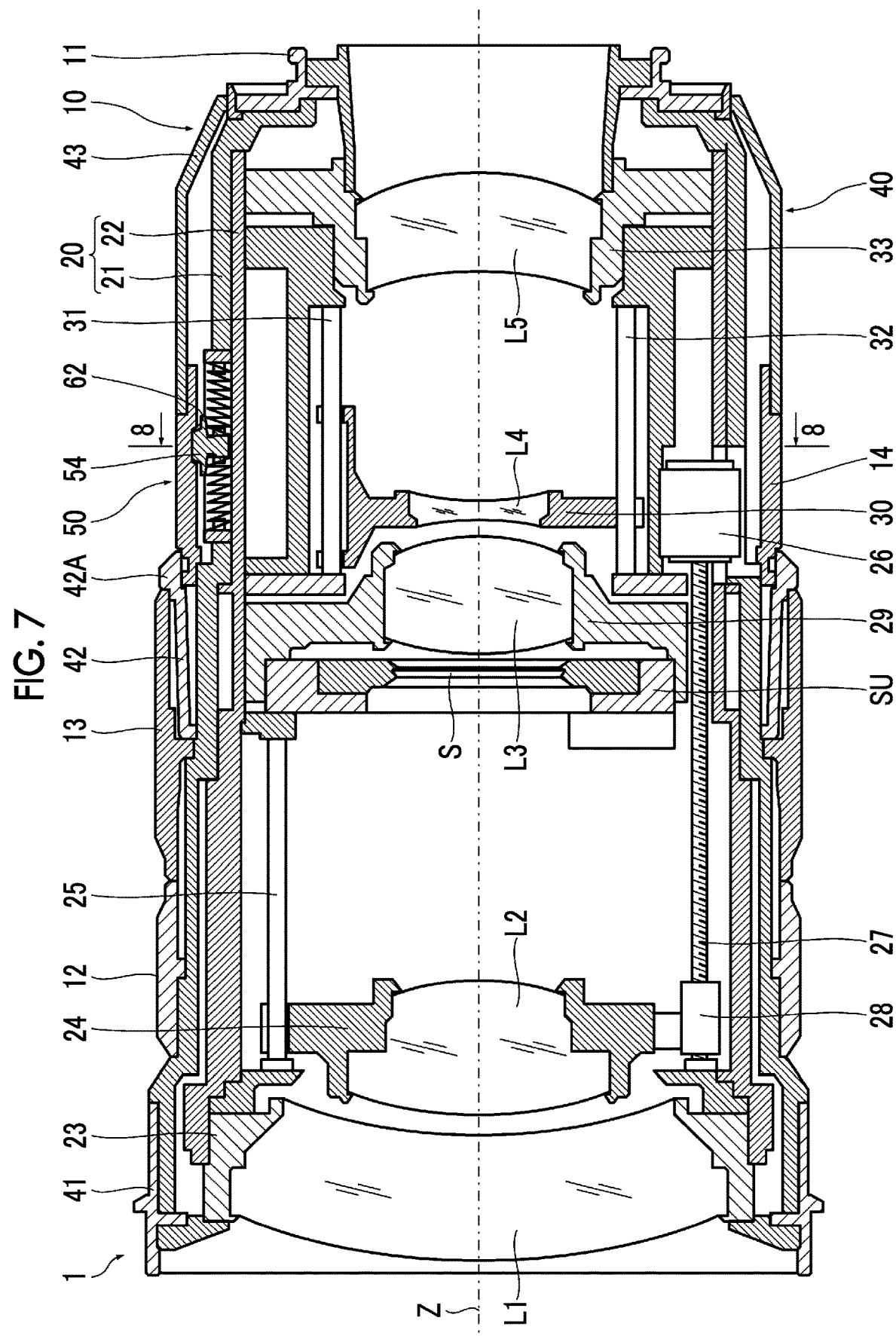
FIG. 7 is a cross-sectional view showing a schematic internal configuration of the interchangeable lens.

FIG. 7 is a cross-sectional view showing a schematic internal configuration of the interchangeable lens.

Configuration of Optical System

As shown in the drawing, the interchangeable lens 1 of the present embodiment includes a first lens group L1, a second lens group L2, a third lens group L3, a fourth lens group L4, and a fifth lens group L5 in order from the object side (the left side in FIG. 7). In addition, the interchangeable lens 1 of the present embodiment includes a stop S between the second lens group L2 and the third lens group L3.

In the interchangeable lens 1 of the present embodiment, the first lens group L1, the third lens group L3 and the fifth lens group L5 are fixed lens groups. On the other hand, the second lens group L2 and the fourth lens group L4 are moving lens groups. Each lens group is composed of at least one lens.

The focal position of the interchangeable lens 1 is changed in a case where the fourth lens group L4 is moved along an optical axis Z. That is, focus adjustment is performed.

The focal length of the interchangeable lens 1 is changed in a case where the second lens group L2 is moved along the optical axis Z. That is, zooming is performed. Note that the fourth lens group L4 is also moved during the zooming. The fourth lens group L4 is moved together with the second lens group L2 and compensates for a change in focal position accompanied by the zooming. That is, the fourth lens group L4 also functions as a compensator.

The stop S is composed of, for example, an iris stop. A unit (stop unit) SU including a drive mechanism of the stop S is disposed between the second lens group L2 and the third lens group L3.

Lens Barrel

The lens barrel 10 is mainly composed of a lens barrel main body 20 and an exterior body 40.

The lens barrel main body 20 includes an inner tube 21 and an outer tube 22. The outer tube 22 holds the inner tube 21 to be coaxial with an inner peripheral portion thereof. That is, the lens barrel main body 20 has a double-layer structure. The inner tube 21 is fixed to the outer tube 22 via fixing means (for example, screws) (not shown) to be integrated with the outer tube 22. The lens barrel main body 20 constitutes a fixed cylinder and the mount 11 is attached to a rear end portion (an end portion on the right side in FIG. 1).

The inner tube 21 mainly has a function of holding an optical system. In the present embodiment, the inner tube 21 is an example of a first lens barrel.

The first lens group L1 is held by a first lens frame 23. As described above, the first lens group L1 is a fixed lens group. The first lens frame 23 is fixed and held at a predetermined position in the inner tube 21.

The second lens group L2 is held by a second lens frame 24. As described above, the second lens group L2 is a moving lens group. The second lens frame 24 is held to be movable along a guide shaft 25 disposed inside the inner tube 21. The guide shaft 25 is disposed along the optical axis Z. Therefore, the second lens group L2 is held to be movable along the optical axis Z.

The second lens group L2 is driven by a zoom motor 26. The zoom motor 26 is composed of, for example, a coreless motor. A lead screw 27 is disposed along the optical axis Z inside the inner tube 21. The second lens frame 24 is connected to a nut 28 attached to a lead screw 27. The zoom motor 26 is connected to the lead screw 27 and rotates the lead screw 27. In a case where the lead screw 27 is rotated by the zoom motor 26, the nut 28 moves along the lead screw 27. Accordingly, the second lens group L2 moves along the optical axis Z.

The third lens group L3 is held by a third lens frame 29. As described above, the third lens group L3 is a fixed lens group. The third lens frame 29 is fixed and held at a predetermined position in the inner tube 21.

A stop unit SU is attached to a front side (the object side (the left side in FIG. 7)) of the third lens frame 29 and is disposed at a predetermined position inside the inner tube 21.

The fourth lens group L4 is held by a fourth lens frame 30. As described above, the fourth lens group L4 is a moving lens group. The fourth lens frame 30 is held to be movable along a main shaft 31 and a sub shaft 32 disposed inside the inner tube 21. Both of the main shaft 31 and the sub shaft 32 are disposed along the optical axis Z. Therefore, the fourth lens group L4 is held to be movable along the optical axis Z.

The fourth lens group L4 is driven by a focus motor (not shown). The focus motor is composed of, for example, a linear motor, and directly moves the fourth lens frame 30 along the optical axis Z.

The fifth lens group L5 is held by a fifth lens frame 33. As described above, the fifth lens group L5 is a fixed lens group. The fifth lens frame 33 is fixed and held at a predetermined position in the inner tube 21.

The outer tube 22 functions as a mount portion for the exterior body 40 and the operation rings. In the present embodiment, the outer tube 22 is an example of a second lens barrel.

The exterior body 40 is mainly composed of a front cover 41, a middle cover 42 and a rear cover 43. The front cover 41 is mounted to an outer peripheral portion of a distal end of the outer tube 22. The middle cover 42 is mounted to the central portion of the outer tube 22. The middle cover 42 includes a fixation ring portion 42A provided at a rear end portion thereof. The middle cover 42 is disposed such that the fixation ring portion 42A is exposed at the outer peripheral surface of the lens barrel 10 through between the zoom ring 13 and the zoom lever ring 14. The fixation ring portion 42A is disposed to be adjacent to the zoom lever ring 14 and has an outer diameter larger than that of the zoom lever ring 14. The rear cover 43 is mounted to an outer peripheral portion of a rear end of the outer tube 22. The exterior body 40 mounted to the outer tube 22 is fixed to the outer tube 22 via fixing means (for example, screws) (not shown) to be integrated with the outer tube 22.

Disposition of Operation Rings

As described above, the interchangeable lens 1 of the present embodiment includes the three operation rings (the focus ring 12, the zoom ring 13, and the zoom lever ring 14). The three operation rings are disposed in the order of the focus ring 12, the zoom ring 13, and the zoom lever ring 14 from the front side (the object side).

Of the three operation rings, only the zoom lever ring 14 is an operation ring with an automatic return function. That is, the remaining two operation rings (the focus ring 12 and the zoom ring 13) are operation rings that stop instantly in a case where the operation rings are stopped to be operated. The zoom lever ring 14 having the automatic return function is disposed closest to the rear side (the image side). Furthermore, the zoom lever ring 14 is disposed to satisfy a condition as follows. That is, as shown in FIG. 7, the zoom lever ring 14 is disposed closer to the rear side (the image side) than the stop S together with a mechanism for an automatic return thereof. More specifically, the zoom lever ring 14 is disposed between a stop surface and a mount surface. Accordingly, even in a case where the zoom lever ring 14 is provided, it is possible to realize, without an increase in size in a radial direction, the interchangeable lens 1 that is small as a whole.

Generally, lenses constituting an optical system have a relationship as follows regarding effective diameters. That is, there is a relationship of "front lens~stop position>stop position~last lens". Here, the front lens is a lens positioned closest to the object side. The last lens is a lens positioned closest to the image side. That is, there is a relationship that the effective diameter of a lens positioned on the image side with respect to the stop position is smaller than that of a lens positioned on the object side. That is, there is a relationship that the maximum outer diameter thereof is small. Therefore, in a case where the optical system is accommodated in a lens barrel of the same size, it is possible to secure a larger radial space for an area from the stop position to the image side than for an area from the stop position to the object side. Therefore, it is possible to provide the zoom lever ring 14 without an increase in diameter of the lens barrel with the zoom lever ring 14 disposed at the position as described above, that is, a position close to the image side with respect to the stop. Particularly, effective action is achieved in a lens device in which the second lens group L2 functions as a variator like the interchangeable lens 1 of the present embodiment. That is, in a lens device in which the second lens group L2 functions as a variator, the movable range of the second lens group L2 is large and thus the second lens group L2 moves fully between the first lens group L1 and the stop unit SU. In this case, since a lens with a large effective diameter is movable up to the vicinity of a stop, it is necessary to secure a lens barrel space at the movable range thereof. Therefore, there is no space between the lens and the lens barrel, and in a case where the zoom lever ring 14 having an automatic return function is disposed, the diameter of the lens barrel needs to be large. On the other hand, in the case of the image side with respect to the stop position, a space can be secured between the lens and the lens barrel. Therefore, it is possible to provide the zoom lever ring 14 without an increase in diameter of the lens barrel with the zoom lever ring 14 disposed at the position as described above, that is, a position close to the image side with respect to the stop.

As described above, in the case of the interchangeable lens 1 of the present embodiment, reduction in size thereof is realized by incorporating the zoom lever ring 14 while advantageously using effective diameter differences from the front lens to the last lens.

Automatic Return Mechanism of Zoom Lever Ring

As described above, the zoom lever ring 14 has an automatic return function, and automatically returns to the neutral point in a case where the zoom lever ring 14 is released after being operated. A mechanism (automatic return mechanism) for an automatic return of the zoom lever ring 14 to the neutral point will be described below.

Figure 8:
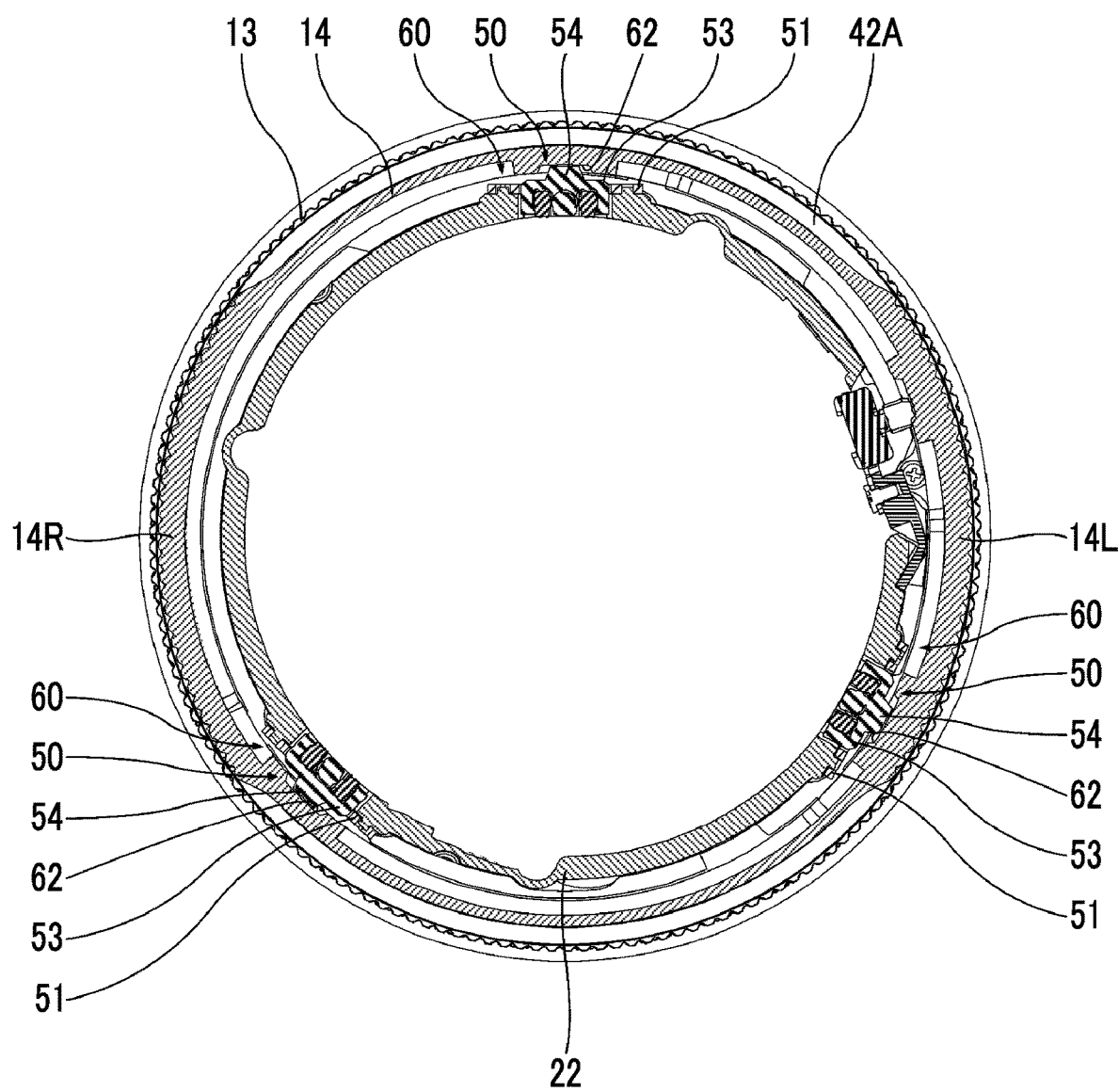
FIG. 8 is a view showing a schematic configuration of an automatic return mechanism.
Figure 9:
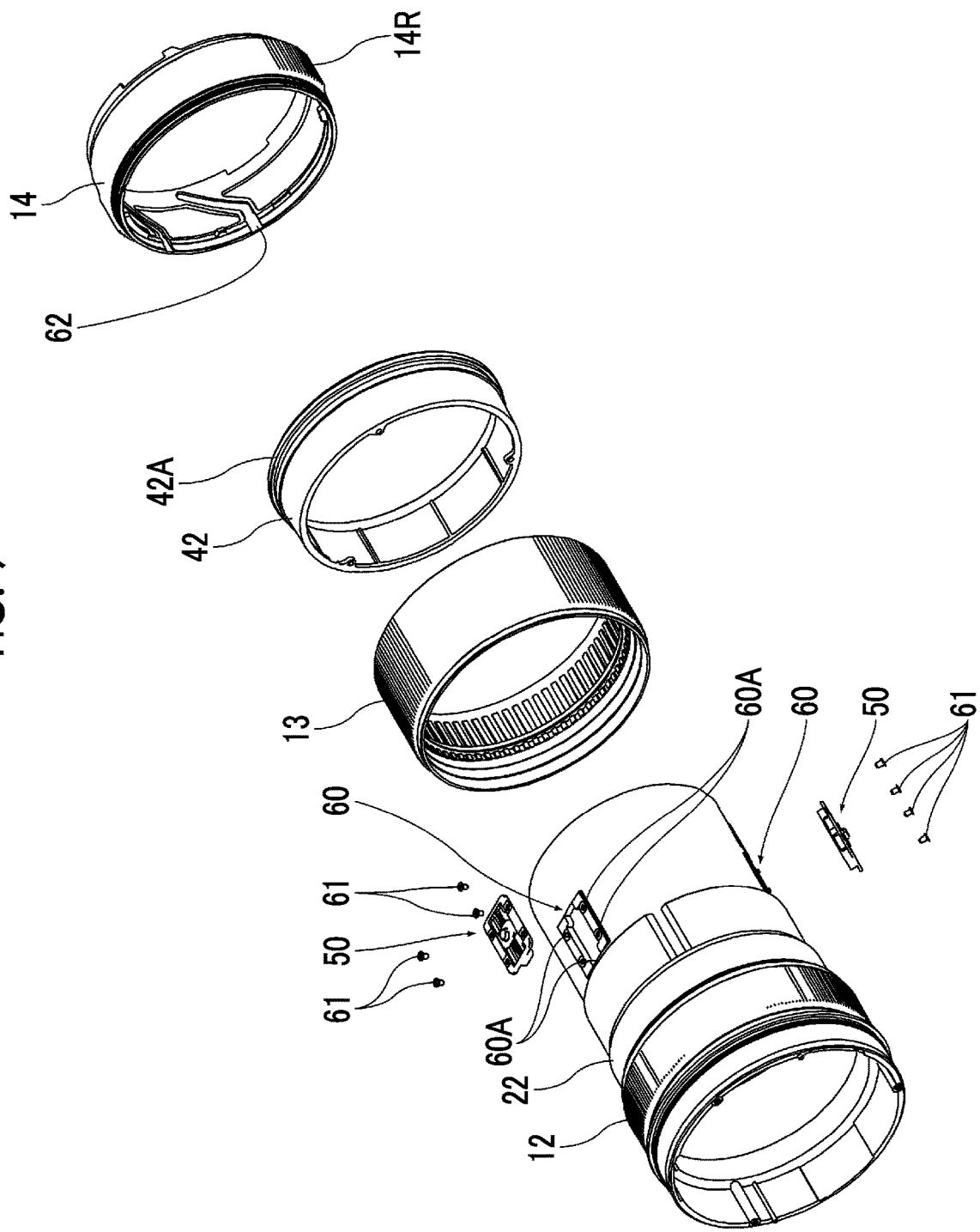
FIG. 9 is an exploded perspective view of a zoom lever ring.

FIG. 8 is a view showing a schematic configuration of the automatic return mechanism. The drawing corresponds to a cross-sectional view of the lens barrel 10 taken along line 8-8 in FIG. 7. In addition, FIG. 9 is an exploded perspective view of the zoom lever ring.

In the interchangeable lens 1 of the present embodiment, the automatic return mechanism of the zoom lever ring 14 is realized by three pressure applying units 50 provided in the outer tube 22. The pressure applying units 50 are structures that generate, with respect to the zoom lever ring 14, a force in a direction opposite to a direction in which the zoom lever ring 14 is operated.

Figure 10:
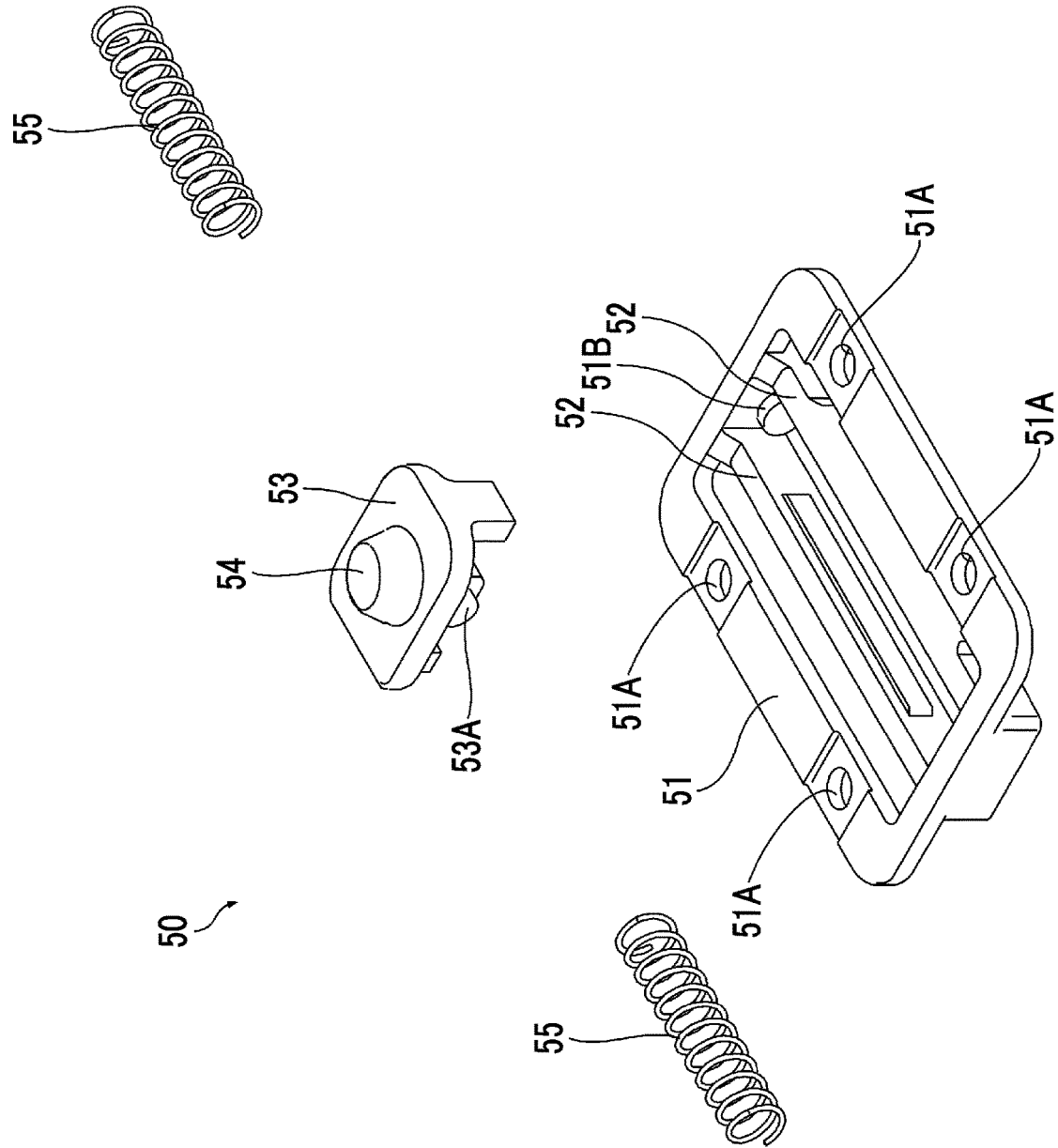
FIG. 10 is an exploded perspective view of a pressure applying unit.
Figure 11:
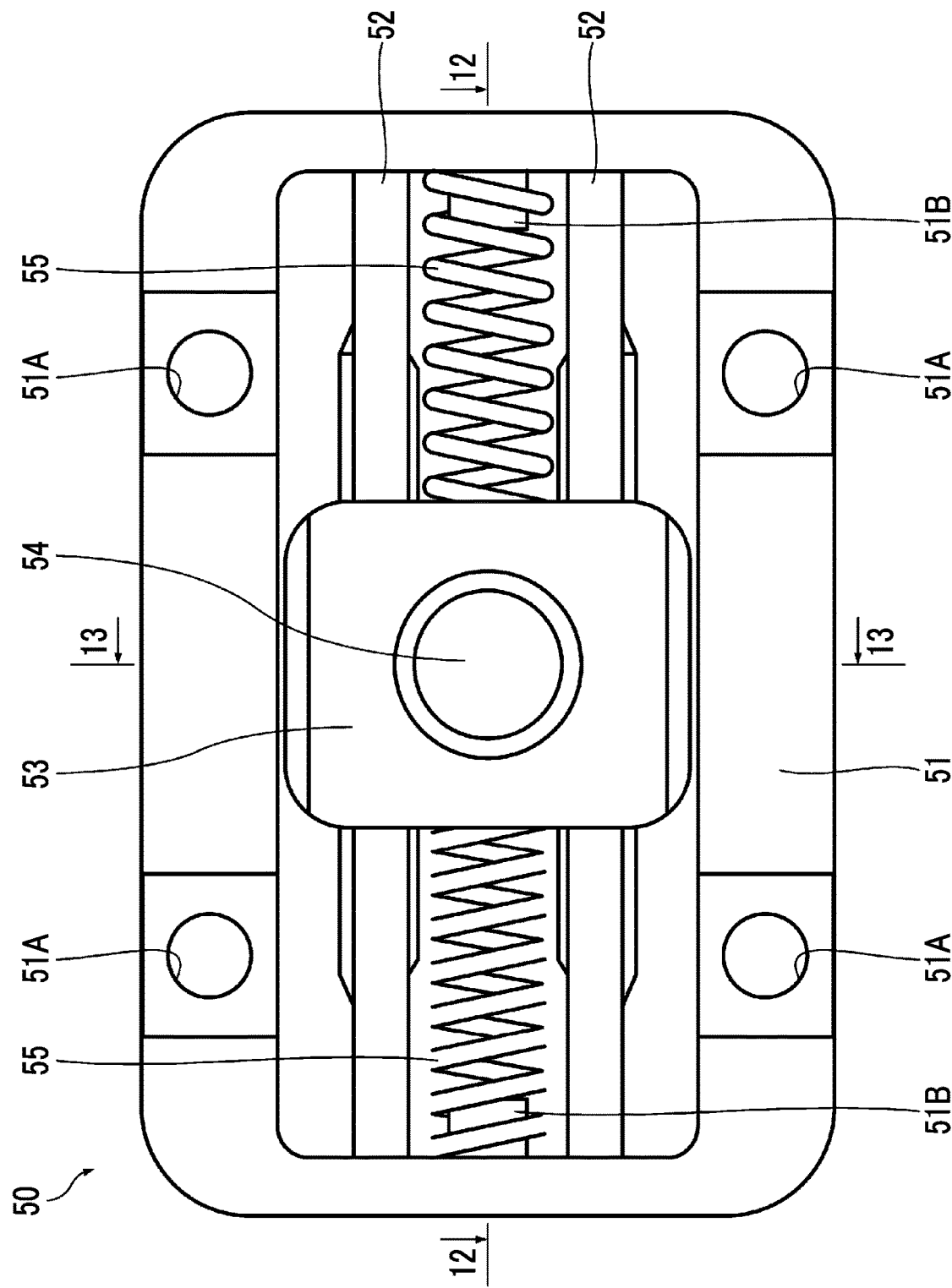
FIG. 11 is a plan view of the pressure applying unit.
Figure 12:
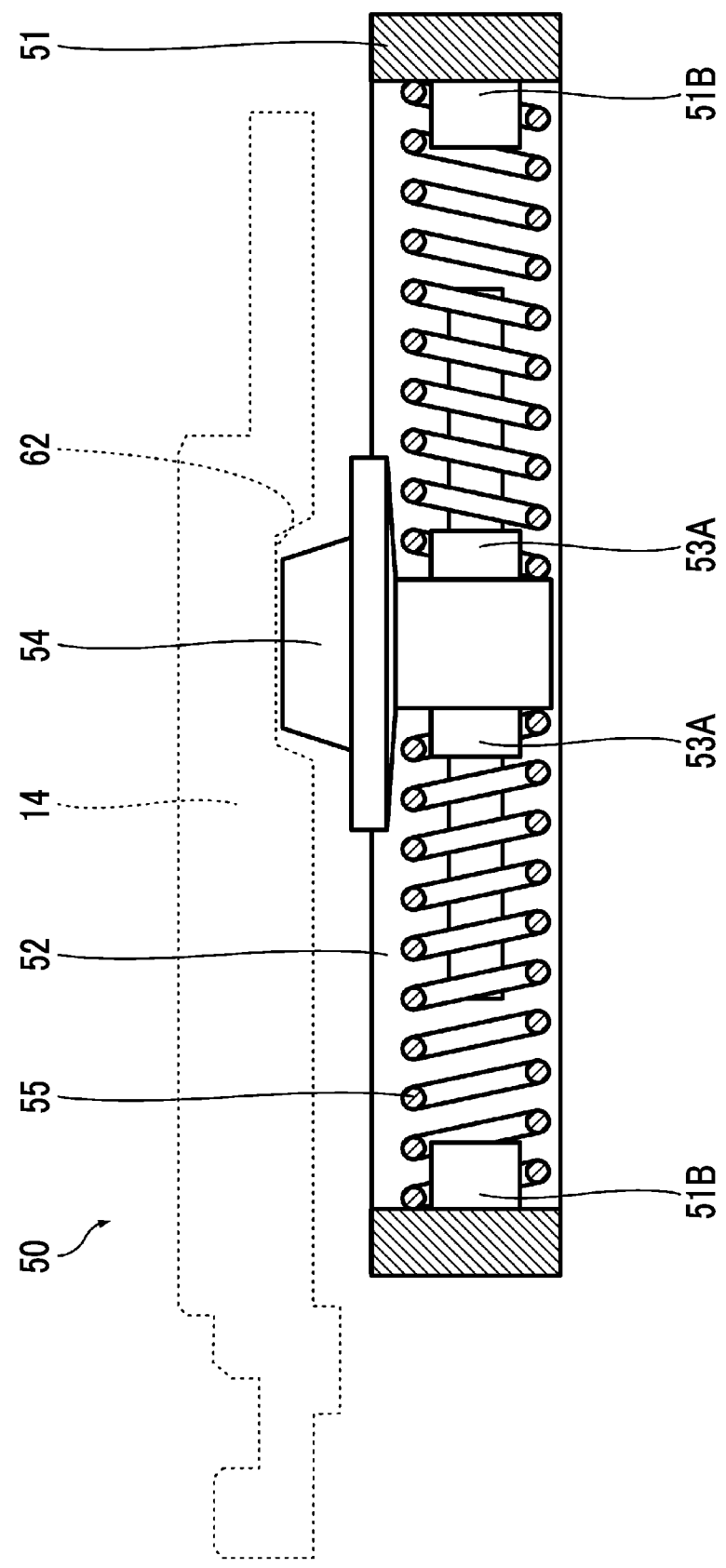
FIG. 12 is a cross-sectional view taken along line 12-12 of FIG. 11.
Figure 13:
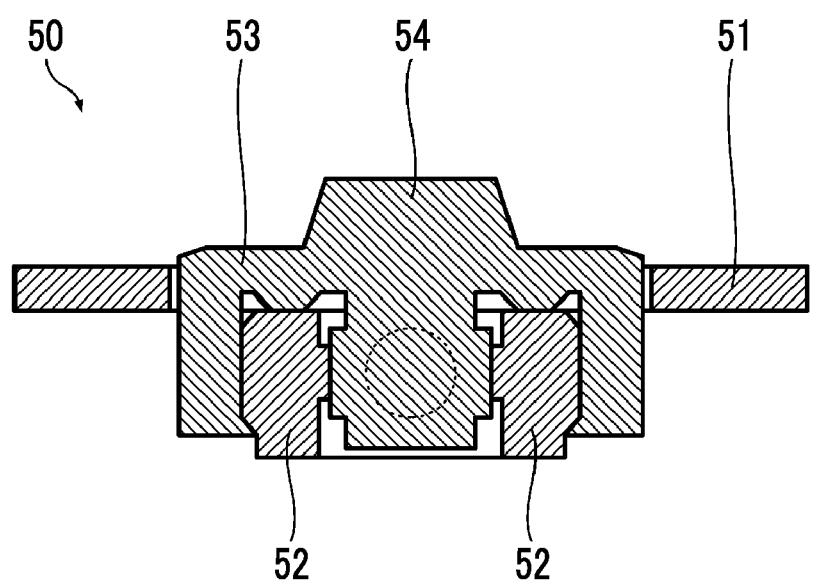
FIG. 13 is a cross-sectional view taken along line 13-13 of FIG. 11.

FIG. 10 is an exploded perspective view of a pressure applying unit. FIG. 11 is a plan view of the pressure applying unit. FIG. 12 is a cross-sectional view taken along line 12-12 of FIG. 11. FIG. 13 is a cross-sectional view taken along line 13-13 of FIG. 11.

The pressure applying unit 50 includes a base frame 51, a pair of guide rails 52 provided on the base frame 51, a slider 53 sliding along the guide rails 52, a cam pin 54 provided on the slider 53, and a pair of springs 55 that biases the slider 53.

The base frame 51 has a flat rectangular frame-like shape with rounded corners. The base frame 51 includes through-holes 51A through which the pressure applying unit 50 is fixed to the lens barrel main body 20 by means of screws. The through-holes 51A are provided at four positions. In the present embodiment, the base frame 51 is an example of a base member.

The pair of guide rails 52 is disposed along a longitudinal direction of the base frame 51. The pair of guide rails 52 is provided to be integrated with the base frame 51.

The slider 53 moves linearly while being guided by the pair of guide rails 52. The slider 53 moves within a frame of the base frame 51.

The cam pin 54 has a circular truncated cone-like shape and is disposed at the center of an upper surface of the slider 53. The cam pin 54 is provided to be integrated with the slider 53.

The pair of springs 55 is arranged in a space between the pair of guide rails 52 and disposed with the slider 53 interposed between the springs 55. The slider 53 is provided with spring fitting portions 53A that are on both sides in a movement direction of the slider 53. The spring fitting portion 53A is composed of a cylindrical projecting portion that can be fitted to an end portion of the spring 55. In addition, the base frame 51 is provided with spring fitting portions 51B that are at both end portions of the space between the pair of guide rails 52. The spring fitting portion 51B is composed of a cylindrical projecting portion that can be fitted to an end portion of the spring 55. One end of the spring 55 is fitted to the spring fitting portion 51B provided on the base frame 51, and the other end of the spring 55 is fitted to the spring fitting portion 53A provided on the slider 53 so that the spring 55 is mounted to the base frame 51. The pair of springs 55 mounted to the base frame 51 bias the slider 53 in opposite directions. Accordingly, in a case where the slider 53 moves along the guide rails 52, a force acts on the slider 53 in a direction opposite to the movement direction.

In the case of the pressure applying unit 50 configured as described above, the cam pin 54 receives a force in the direction opposite to the movement direction because of the action of the springs 55 and automatically returns to a neutral point.

As shown in FIG. 8, the pressure applying units 50 are disposed at three positions in a circumferential direction of the outer tube 22. The outer tube 22 is provided with pressure applying unit attachment portions 60 that are at three positions on an outer peripheral surface thereof. The pressure applying unit attachment portion 60 is provided with four screw holes 60A corresponding to the four through-holes 51A provided in the base frame 51. Four portions of the base frame 51 are fixed by means of screws 61 after the base frame 51 is placed on the pressure applying unit attachment portion 60, so that the pressure applying unit 50 is attached to a predetermined position on the outer peripheral surface of the outer tube 22 in a predetermined posture. Specifically, the attachment is performed such that the cam pin 54 moves along the optical axis Z.

As shown in FIG. 8, the zoom lever ring 14 includes cam grooves 62 on an inner peripheral portion thereof. The cam groove 62 is disposed to correspond to the pressure applying unit 50. Therefore, three cam grooves 62 are provided in the interchangeable lens 1 of the present embodiment. The three cam grooves 62 are provided on the inner peripheral portion of the zoom lever ring 14 at intervals corresponding to intervals at which the pressure applying units 50 are disposed.

FIG. 14 is a see-through view of a cam groove provided at the zoom lever ring. In the drawing, a direction represented by an arrow z is a direction along the optical axis.

As shown in the drawing, the cam groove 62 includes an introduction portion 62A and a lead portion 62B. The introduction portion 62A is a portion that guides the cam pin 54 to the lead portion 62B. The introduction portion 62A is disposed along the optical axis Z. In addition, the introduction portion 62A is provided such that an end portion on the object side is open. The lead portion 62B is a portion along which the cam pin 54 moves in a case where the zoom lever ring 14 is operated. The lead portion 62B is disposed to diagonally intersect the optical axis Z. For example, the lead portion 62B is disposed to intersect the optical axis Z at an angle of 45°. A length Lc of the lead portion 62B in the optical axis direction is set to be shorter than the movable range of the cam pin 54 in the pressure applying unit 50.

FIGS. 15A and 15B are views showing a relationship between the operation of the zoom lever ring and movement of the cam pin. FIG. 15A shows the way in which the cam pin 54 moves as seen in a front view in a case where the zoom lever ring 14 is operated in a clockwise direction CW. FIG. 15B shows the way in which the cam pin 54 moves as seen in a front view in a case where the zoom lever ring 14 is operated in a counterclockwise direction CCW.

As shown in FIG. 15A, in a case where the zoom lever ring 14 is operated in the clockwise direction CW, the cam pin 54 moves along the optical axis toward the object side. In a case where the cam pin 54 moves from a neutral point, the cam pin 54 receives a force in a direction opposite to the movement direction thereof from the spring 55. As a result, in a case where the zoom lever ring 14 is released, the cam pin 54 moves toward the image side. As the cam pin 54 moves in a direction toward an image, the zoom lever ring 14 rotates in a counterclockwise direction because of the action of the cam groove 62 and an automatic return to the neutral point is performed.

As shown in FIG. 15B, in a case where the zoom lever ring 14 is operated in the counterclockwise direction CCW, the cam pin 54 moves along the optical axis toward the image side. As described above, in a case where the cam pin 54 moves from a neutral point, the cam pin 54 receives a force in a direction opposite to the movement direction thereof from the spring 55. As a result, in a case where the zoom lever ring 14 is released, the cam pin 54 moves toward the object side. As the cam pin 54 moves in a direction toward an object, the zoom lever ring 14 rotates in a clockwise direction because of the action of the cam groove 62 and an automatic return to the neutral point is performed.

Rotation Detection Mechanism of Zoom Lever Ring

The direction of rotation (the direction of operation) and the angle of rotation (the amount of operation) of the zoom lever ring 14 are detected by a rotation detection unit 64 attached to the outer tube 22. More specifically, a rotary angular position with respect to the neutral point is detected.

The rotation detection unit 64 includes a cam pin that is movable along the optical axis Z and a linear sensor that detects the position of the cam pin. The cam pin is fitted into a sensing cam groove provided on the inner peripheral portion of the zoom lever ring 14. In a case where the zoom lever ring 14 is rotated, the cam pin moves in accordance with the direction of rotation and the angle of rotation (the rotation amount) thereof. The linear sensor detects the position of the cam pin with respect to a reference point. The reference point is set at the position of the neutral point. The rotary angular position of the zoom lever ring 14 is calculated from the position of the cam pin that is detected by the linear sensor. Then, the direction of rotation and the angle of rotation of the zoom lever ring 14 are calculated from the rotary angular position of the zoom lever ring 14. Calculation processing is performed by a processor (for example, a lens microcomputer) provided in the interchangeable lens 1 or a processor (for example, a camera microcomputer) of a camera body to which the interchangeable lens 1 is mounted.

Note that the above-described configuration is merely an example, and the rotary angular position of the zoom lever ring 14 can also be detected by means of another mechanism. For example, a sensor that detects the neutral point and a sensor that detects the angle of rotation (the amount of rotation) can be combined to detect the rotary angular position of the zoom lever ring 14.

Function of Zoom Lever Ring

As described above, the zoom lever ring 14 is mainly used for a zooming operation. Particularly, in the interchangeable lens 1 of the present embodiment, the zoom lever ring 14 is used for variable-speed zooming. The variable-speed zooming is a function of zooming at a speed corresponding to the amount of operation. In the interchangeable lens 1 of the present embodiment, a zooming speed (the speed of a change in angle of view) is set in accordance with the angle of rotation (the rotation amount) of the zoom lever ring 14.

Figure 16:
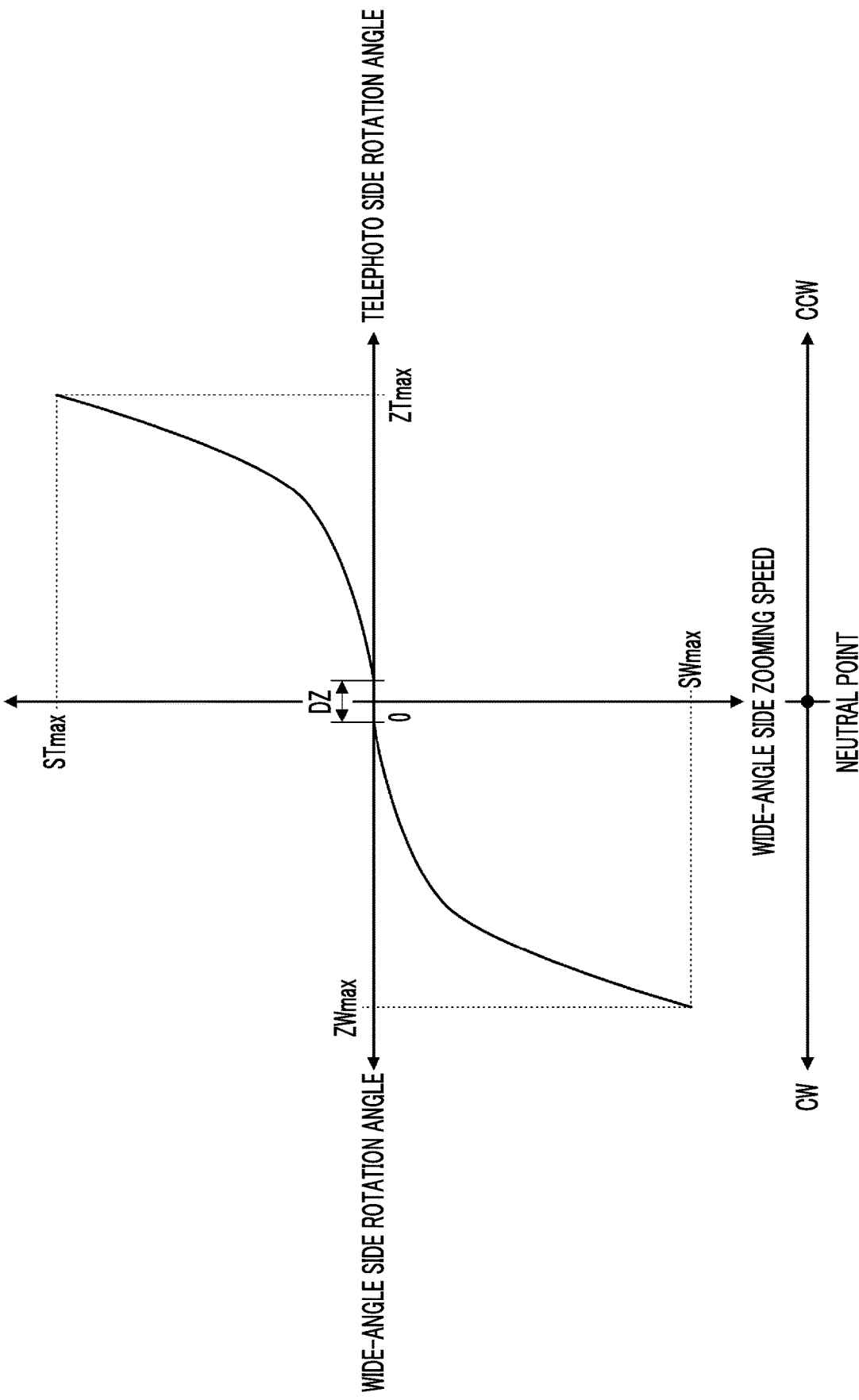
FIG. 16 is a graph showing an example of a relationship between the angle of rotation of the zoom lever ring and a zooming speed.

FIG. 16 is a graph showing an example of a relationship between the angle of rotation of the zoom lever ring and the zooming speed.

In the drawing, the horizontal axis represents the angle of rotation of the zoom lever ring 14. In addition, the vertical axis represents the zooming speed to be set. Note that, regarding the horizontal axis, a right side with respect to an origin O (the neutral point) represents the angle of rotation on the telephoto side and a left side represents the angle of rotation on the wide-angle side. In addition, regarding the vertical axis, an upper side with respect to the origin O represents the zooming speed on the telephoto side and a lower side represents the zooming speed on the wide-angle side. In the same drawing, ZTmax is the maximum angle of rotation on the telephoto side. ZWmax is the maximum rotation on the wide-angle side. STmax is the maximum zooming speed on the telephoto side. SWmax is the maximum zooming speed on the wide-angle side.

Regarding the interchangeable lens 1 of the present embodiment, zooming in a telephoto direction is performed in a case where the zoom lever ring 14 is rotated in the counterclockwise direction CCW as seen in a front view and zooming to the wide-angle side is performed in a case where the zoom lever ring 14 is rotated in the clockwise direction CW.

As shown in FIG. 16, as the angle of rotation of the zoom lever ring 14 increases, the zooming speed to be set is made higher. Particularly, in the present embodiment, as the angle of rotation of the zoom lever ring 14 increases, the zooming speed to be set is made higher curvilinearly. Accordingly, rapid zooming and fine zooming in a very low speed range can be selectively used, so that excellent operability can be provided.

In addition, as shown in FIG. 16, in the interchangeable lens 1 of the present embodiment, a dead zone DZ is set in a predetermined angular range on each of the telephoto side and the wide-angle side with respect to the neutral point (origin O). Accordingly, it is possible to restrain fine movements of the hand or the like holding the zoom lever ring 14 from being transmitted to the zoom lever ring 14, which results in unintentional zooming.

Switching between Functions of Zoom Lever Ring

As described above, the zoom lever ring 14 is mainly used for a zooming operation (variable-speed zooming). However, the zoom lever ring 14 can also be used for operations other than a zooming operation. That is, a function assigned thereto can be switched. A function assigned to the zoom lever ring 14 is switched by means of the switching button 16. In the interchangeable lens 1 of the present embodiment, each time the switching button 16 is pressed, a function assigned to the zoom lever ring 14 is switched between variable-speed zooming and variable-speed focusing. Variable-speed focusing is a function of focusing at a speed corresponding to the amount of operation (a function of moving the focal position at a speed corresponding to the amount of operation). In the present embodiment, the focusing speed is set in accordance with the angle of rotation of the zoom lever ring 14. It is preferable that the focusing speed to be set is changed curvilinearly as in the case of the variable-speed zooming. That is, as the angle of rotation increases, the focusing speed is increased curvilinearly. In addition, it is preferable that a dead zone is set. Note that, in the case of a focusing operation, the focal point moves to an infinity side in a case where the zoom lever ring 14 is operated in the counterclockwise direction and the focal point moves to a near side in a case where the zoom lever ring 14 is operated in the clockwise direction.

Operation of Interchangeable Lens

As described above, the interchangeable lens 1 of the present embodiment includes the focus ring 12, the zoom ring 13, and the zoom lever ring 14 as operation members. In the case of the interchangeable lens 1, a focusing operation is performed by means of the focus ring 12. In addition, in the case of the interchangeable lens 1, a zooming operation is performed by means of the zoom ring 13 and the zoom lever ring 14. Regarding the zooming operation, a normal zooming operation is performed by means of the zoom ring 13. That is, zooming corresponding to the amount of rotation is performed by means of the zoom ring 13. Meanwhile, variable-speed zooming is performed by means of the zoom lever ring 14. That is, zooming in which the zooming speed changes in accordance with the angle of rotation is performed. A function assigned to the zoom lever ring 14 can be switched by means of the switching button 16 provided on the button operation unit 15 and each time the switching button 16 is pressed, a function assigned to the zoom lever ring 14 is switched between variable-speed zooming and variable-speed focusing. The button operation unit 15 further includes a zoom button 17, so that a constant-speed zooming operation is performed.

As described above, the interchangeable lens 1 of the present embodiment includes the zoom lever ring 14 and the zoom button 17 in addition to the zoom ring 13 as operation members for zooming, and thus a zooming operation different from a normal zooming operation can be performed. That is, it is possible to perform a variable-speed zooming operation and a constant speed zooming operation. Accordingly, it is possible to provide favorable operability in relation to zooming. Particularly, the favorable operability can be provided in capturing a motion picture.

In addition, since a function assigned to the zoom lever ring 14 can be switched by means of the switching button 16, favorable operability can be provided even in the case of operations other than a zooming operation.

Note that, in the interchangeable lens 1 of the present embodiment, the zoom lever ring 14 and the button operation unit 15 are disposed to be adjacent to each other. This layout has an effect as follows. That is, since the button operation unit 15 includes a button (the switching button 16) for switching the settings of the zoom lever ring 14, it is possible to set functions and perform an operation only by a fingertip while holding a camera with the zoom lever ring 14 and the button operation unit 15 disposed to be adjacent to each other.

Here, "being adjacent to each other" may not mean being in contact with each other. The zoom lever ring 14 and the button operation unit 15 may be at positions satisfying a distance relationship in which a finger (a thumb) can come into contact with the zoom lever ring 14 and the button operation unit 15 even in a case where only the finger is moved while the position of a hand holding the interchangeable lens 1 is maintained.

In addition, in the interchangeable lens 1 of the present embodiment, the button operation unit 15 includes the projecting portion 15A, and the height of the projecting portion 15A is higher than the height of the protrusion portion 14R of the zoom lever ring 14, which results in an effect as follows. That is, in a case where the zoom lever ring 14 is operated with the protrusion portion 14R gripped, a finger comes into contact with the projecting portion 15A of the button operation unit 15. Therefore, it is possible to confirm that only the zoom lever ring 14 is being operated without visually confirming the position of the zoom lever ring 14.

Furthermore, in the interchangeable lens 1 of the present embodiment, the fixation ring portion 42A is disposed to be adjacent to the zoom lever ring 14. Therefore, it is also possible to confirm that only the zoom lever ring 14 is being operated with the fixation ring portion 42A. Particularly, in the interchangeable lens 1 of the present embodiment, since the fixation ring portion 42A has a larger outer diameter than the zoom lever ring 14, it can be more easily determined that only the zoom lever ring 14 is being operated. In addition, with the fixation ring portion 42A, it is possible to restrain the zoom ring 13 from being operated at the same time.

In addition, in the interchangeable lens 1 of the present embodiment, both ends of the projecting portion 15A of the button operation unit 15 and both ends of the protrusion portion 14R of the zoom lever ring 14 are composed of inclined surfaces and are disposed in parallel. Accordingly, an effect as follows can be achieved. That is, the amount of offset between the inclined surfaces that occurs in a case where the zoom lever ring 14 is operated can be felt via fingers and the amount of operation of the zoom lever ring 14 can be intuitively grasped without visual observation of the zoom lever ring 14.

In addition, in the interchangeable lens 1 of the present embodiment, the zoom lever ring 14 and is disposed to be adjacent to the zoom ring 13. Accordingly, it is easy to perform a zooming operation while using both of the zoom lever ring 14 and the zoom ring 13. That is, it is possible to provide a favorable environment for a zooming operation. Usually, a user does not perform a focusing operation (manual focusing) in which the focus ring 12 is used and a zooming operation in which the zoom ring 13 is used at the same time. This is because the focal position is automatically tracked because of zooming. Therefore, it is preferable to dispose the zoom ring 13 and the zoom lever ring 14 to be adjacent to each other. Accordingly, it is possible to provide a favorable environment for a zooming operation.

Meanwhile, it is preferable that the fixation ring portion 42A is disposed between the zoom ring 13 and the zoom lever ring 14 as a separator. Accordingly, as described above, it is possible to confirm that only the zoom lever ring 14 is being operated without visual observation.

As described above, it is preferable that the zoom lever ring 14 is disposed to be adjacent to the button operation unit 15 and the zoom ring 13. Therefore, it is preferable that the zoom lever ring 14 is disposed between the zoom ring 13 and the button operation unit 15. Particularly, in the interchangeable lens 1 of the present embodiment, the button operation unit 15 is also provided with the zoom button 17, and thus adopting this layout can provide a better environment for a zooming operation.

In addition, since the focus ring 12 is disposed to be adjacent to the zoom ring 13 as with a general interchangeable lens (that is, an interchangeable lens with no zoom lever ring 14), the same operation environment as the general interchangeable lens can be provided. Accordingly, new functions can be added without a sense of incongruity. Particularly, in the interchangeable lens 1 of the present embodiment, since the fixation ring portion 42A is disposed between the zoom ring 13 and the zoom lever ring 14, it is possible to easily distinguish between a general operation system and a special operation system.

In addition, in the interchangeable lens 1 of the present embodiment, the zoom lever ring 14 includes the protrusion portions 14R and 14L and thus an effect as follows can be achieved. That is, since a shape different from that of a usual operation ring (that is, a general zoom ring, a general focus ring, and the like without a protrusion portion) is adopted, it is possible to intuitively grasp that the zoom lever ring 14 is an operation member having a different function.

Furthermore, in the interchangeable lens 1 of the present embodiment, the zoom lever ring 14 has the smallest diameter out of the operation rings and thus an effect as follows can be achieved. That is, regarding the usability of the zoom lever ring 14, the zoom lever ring 14 is supposed to be operated in a state where a fingertip of a user is in contact with the zoom lever ring 14 throughout an imaging operation. For realization of a comfortable operation with a fingertip, it is preferable that the zoom lever ring 14 has the smallest diameter out of all of the operation rings provided in the interchangeable lens. In other words, it is possible to realize favorable operability by configuring the zoom lever ring 14 to have the smallest diameter out of all of the operation rings provided in the interchangeable lens.

With regard to this, in the interchangeable lens 1 of the present embodiment, the zoom lever ring 14 having a small diameter is realized by disposing the zoom lever ring 14 closer to the image side than the position of the stop. That is, as described above, in the interchangeable lens, it is possible to secure a larger radial space for the image side than the object side with respect to the position of the stop. Therefore, with the zoom lever ring 14 being disposed closer to the image side than the position of the stop together with the automatic return mechanism, the zoom lever ring 14 can be incorporated compactly without an increase in diameter of the lens barrel 10.

In addition, since the zoom lever ring 14 is disposed closer to the image side than the position of the stop, an effect as follows can be achieved. That is, since the zoom lever ring 14 is disposed closer to the image side than the position of the stop, the zoom lever ring 14 is disposed at a position close to the camera body. Generally, in the case of an interchangeable lens camera, a user performs an imaging operation while holding a grip of the camera body with the right hand and supporting the camera body with the palm of the left hand. The zoom lever ring 14 is an operation member mainly used for variable-speed zooming, and the variable-speed zooming is mainly used to capture a motion picture. In a case where the variable-speed zooming is used to capture a motion picture, the zoom lever ring 14 is always operated with a finger placed thereon. Therefore, with the zoom lever ring 14 being disposed at a position close to the camera body, a favorable operability for the case of capturing a motion picture can be provided. Particularly, in the interchangeable lens 1 of the present embodiment, the zoom lever ring 14 is disposed closest to the image side out of the plurality of operation rings and thus the zoom lever ring 14 can be operated by a fingertip of the left hand with the camera body supported by the palm of the right hand. Accordingly, it is possible to operate a camera while reliably holding the camera even in the case of hand-held imaging.

Modification Examples

Shape of Zoom Lever Ring

In the above-described embodiment, the shape of the zoom lever ring is an annular shape provided with protrusion portions. However, the shape of the zoom lever ring is not limited thereto. An annular shape without protrusion portions may also be adopted. In addition, for example, a shape that is partially cut off like a C-shaped ring may also be adopted.

In addition, in the above-described embodiment, the zoom lever ring is provided with a pair of protrusion portions. However, the protrusion portion may be provided at only one position. In this case, it is preferable that the protrusion portion is provided on a button operation unit side. In addition, the protrusion portions may be provided at three or more positions.

Note that, in consideration of the operability, it is preferable that the zoom lever ring is configured so that the zoom lever ring can be operated with two fingers. Therefore, it is preferable that the protrusion portions are provided at two positions. It is preferable that the two positions are positions that are at opposite angles and are horizontal at the neutral point.

Button Operation Unit

In the above-described embodiment, the button operation unit is provided on a projecting portion. However, the button operation unit may be provided on an arc surface of an outer periphery of the lens barrel. In addition, a configuration in which the projecting portion is not provided with the button operation unit may also be adopted. That is, only the projecting portion with no button may also be provided.

Automatic Return Mechanism

In the above-described embodiment, the pressure applying units are used to configure the automatic return mechanism of the zoom lever ring. However, the configuration of the automatic return mechanism of the zoom lever ring is not limited thereto. Other configurations can also be adopted. For example, a configuration in which a pair of springs disposed in the circumferential direction holds the zoom lever ring at the neutral point and the like can also be adopted. In this case, for example, one end of a spring is fixed to the zoom lever ring and the other end of the spring is fixed to the lens barrel main body or an exterior body fixed and attached to the lens barrel main body.

Note that, the automatic return mechanism for which the pressure applying units are used as in the case of the interchangeable lens of the above-described embodiment has effects as follows. That is, since the springs are disposed along the optical axis direction and a biasing direction is converted by the cam pins and the cam grooves, the units can be thinned. Accordingly, the diameter of the zoom lever ring can be made small. In addition, assembly is facilitated because of unitization. Particularly, in the case of the interchangeable lens of the above-described embodiment, the pressure applying units are assembled to the outer peripheral portion of the outer tube and thus the assembly operation can be facilitated. In the above-described embodiment, the pressure applying units are fixed to the outer tube with screws. However, a structure for fixation of the pressure applying units is not limited thereto. Alternatively, for example, a configuration in which a structure such as a snap-fit structure is used for attachment to the outer tube can also be adopted.

Note that a configuration in which the function of the pressure applying unit is directly given to the lens barrel without unitization into the pressure applying unit can also be adopted. That is, a configuration, in which the function of the base frame 51 is realized by the outer peripheral portion of the outer tube 22 and the cam pin 54 is directly held by the outer tube 22 such that the cam pin 54 can be moved, can also be adopted. In this case, the outer tube 22 is provided with a guide rail that guides the movement of the cam pin 54. In addition, the springs 55 that bias the cam pin 54 are directly attached to the outer tube 22.

In addition, regarding the guiding of the cam pin and the holding of the springs, the following mechanism can also be adopted. That is, a configuration in which the cam pin is supported to be slidable along the guide shaft and a spring is mounted to the guide shaft to bias the cam pin can also be adopted.

In addition, a spring that biases the cam pin may be coated with grease (for example, high-viscosity grease) to provide damping properties.

In addition, in the case of the automatic return mechanism of the above-described embodiment, the cam pin movable along the optical axis direction is biased by the pair of springs from both sides in the optical axis direction to be held at the neutral point. However, for example, a configuration in which the cam pin is biased by one spring in one direction to be held at the neutral point can also be adopted. In this case, for example, an inner peripheral surface of the zoom lever ring is provided with a V-shaped cam groove.

In addition, in the case of a configuration in which the pair of springs biases the cam pin from both sides in the optical axis direction, a plurality of sets of springs may be used to bias the cam pin. That is, a combination of any number of springs may be used as long as biasing forces from both sides are balanced. Therefore, a configuration in which one side is biased by one spring and the other side is biased by a combination of two springs can also be adopted. In this case, for example, a configuration, in which three springs are disposed on respective sides of a Y-like shape, one side is biased by two springs, and the other side is biased by one spring, can also be adopted.

Furthermore, a configuration in which the spring is disposed in the circumferential direction can also be adopted. That is, a configuration in which the cam pin is biased in the circumferential direction by the spring disposed in the circumferential direction and the cam pin is caused to automatically return to the neutral point can also be adopted.

In addition, in the above-described embodiment, the pressure applying units are disposed at three positions in the circumferential direction. However, the number of pressure applying units to be disposed is not limited thereto. The pressure applying unit may be disposed at only one position in the circumferential direction. That is, one pressure applying unit may constitute the automatic return mechanism. In addition, the pressure applying units may be disposed at two positions in the circumferential direction and may be disposed at a plurality of positions by being disposed at four or more positions.

Note that, in a case where the automatic return mechanism is configured by using a plurality of pressure applying units, effects as follows can be achieved.

That is, since a combination of the pressure applying units, into which springs having different spring constants are incorporated, is used, it is possible to adjust a reaction force received in the case of operation. For example, pressure applying units into which springs having a standard spring constant are incorporated, pressure applying units into which springs having a spring constant smaller than the standard spring constant are incorporated, and pressure applying units into which springs having a spring constant larger than the standard spring constant are incorporated are prepared. In this case, the operation reaction force can be set in 27 ways (3×3×3 ways). Note that such an effect can be achieved by simply replacing the springs. In addition, the pressure applying unit may be configured to be replaceable at at least one position. That is, a force acting on the zoom lever ring may be adjustable at at least one position.

In addition, positions at which the pressure applying units are disposed are not particularly limited. However, in a case where the zoom lever ring is provided with the protrusion portions, it is preferable that the pressure applying units are disposed at positions different from the positions of the protrusion portions. The positions of the protrusion portions of the zoom lever ring are positions where the protrusion portions are disposed in a case where the zoom lever ring is positioned at the neutral point. In the case of the interchangeable lens 1 of the above-described embodiment, as shown in FIG. 8, in a case where the zoom lever ring 14 is positioned at the neutral point, the two protrusion portions 14R and 14L are disposed at horizontal positions. A position where one protrusion portion 14R is disposed in a case where the zoom lever ring 14 is positioned at the neutral point will be referred to as a position of 0°, and a position where the other protrusion portion 14L is disposed in a case where the zoom lever ring 14 is positioned at the neutral point will be referred to as a position of 180°. The pressure applying units 50 are disposed to avoid the position of 0° and the position of 180°. That is, the pressure applying units 50 are disposed at positions in the circumferential direction of the lens barrel 10 not to be in phase with the protrusion portions 14R and 14L. As described above, the protrusion portions 14R and 14L of the zoom lever ring 14 function as grip portions in a case where the zoom lever ring 14 is to be operated. Since the pressure applying units 50 are disposed to avoid the positions of the protrusion portions 14R and 14L, it is possible to suppress hindrance to the movement of the cam pins in a case where the protrusion portions 14R and 14L are strongly gripped. That is, in a case where the pressure applying units are disposed at the same positions as the protrusion portions and the zoom lever ring 14 is deformed with the protrusion portions strongly gripped, a force that retains the cam pins in the outer diameter direction may act. Such a problem can be suppressed with the pressure applying units disposed to avoid the protrusion portions.

Note that, as described above, it is preferable that the zoom lever ring includes protrusion portions at two positions. Therefore, it is preferable that the pressure applying unit is disposed at one or three positions to avoid the positions of the two protrusion portions.

In addition, it is preferable that the pressure applying units are disposed between the lens barrel main body and the zoom lever ring in a plane perpendicular to the optical axis. Since the pressure applying units are disposed between the lens barrel main body and the zoom lever ring, the pressure applying units are disposed radially outside at least a lens disposed closer to the image side than the position of the stop. In addition, the pressure applying units are disposed radially inside the zoom lever ring. Note that, adopting a configuration in which the pressure applying units 50 are assembled to the outer peripheral portion of the outer tube 22 as in the case of the interchangeable lens 1 of the above-described embodiment can facilitate the assembly operation.

Note that, regarding the lens barrel main body, adopting a double-layer structure as in the case of the interchangeable lens 1 of the present embodiment results in an effect as follows. That is, since the inner tube 21 holding the lenses and the outer tube 22 to which the operation rings are assembled are separated, transmission of vibration, which is accompanied by the operation of the operation rings, to the lenses can be suppressed. Particularly, transmission of vibration, which is generated in a case where the zoom lever ring 14 having an automatic return function realized by springs is operated, to the lenses can be suppressed.

In addition, in the above-described embodiment, the pressure applying units are disposed on the lens barrel main body side and the cam grooves are provided on the zoom lever ring side. However, the relationship therebetween may be reversed. That is, a configuration in which the pressure applying units are attached on the zoom lever ring side and the cam grooves are disposed on the lens barrel main body side (specifically, on the outer peripheral surface of the outer tube) may also be adopted.

Operation Rings Provided for Lens Barrel

In the interchangeable lens 1 of the above-described embodiment, the lens barrel is provided with the three operation rings (focus ring, zoom ring, and zoom lever ring). However, the number and types of operation rings provided for the lens barrel are not limited thereto. The number and types of operation rings provided for the lens barrel are not limited thereto as long as at least the zoom lever ring is provided. Therefore, for example, a configuration in which only the zoom lever ring and the zoom ring are provided or a configuration in which only the zoom lever ring and the focus ring are provided can also be adopted in addition to a configuration in which only the zoom lever ring is provided. Furthermore, a stop ring may be provided instead of or in addition to the focus ring and/or the zoom ring.

In a case where the plurality of operation rings are provided as described above, it is preferable that the zoom lever ring has the smallest diameter. Note that cases where the zoom lever ring has the smallest diameter include a case where there are a plurality of operation rings having the smallest diameter. For example, in a case where the focus ring, the zoom ring, and the zoom lever ring are provided and the outer diameters of the zoom ring and the zoom lever ring are the same as each other and are smaller than the outer diameter of the focus ring, the zoom lever ring and the zoom ring are smallest in diameter. In addition, a case where all the operation rings have the same outer diameter is also included in cases where the zoom lever ring has the smallest diameter.

In addition, in the interchangeable lens 1 of the above-described embodiment, a fixation portion (the fixation ring portion 42A) is disposed between the zoom ring 13 and the zoom lever ring 14. However, a configuration in which no fixation portion is disposed between the operation rings can also be adopted. That is, a configuration in which the plurality of operation rings are continuously disposed can also be adopted.

Purpose of Use of Zoom Lever Ring

The zoom lever ring can also be used for a purpose other than the variable-speed zooming. For example, regarding the zooming operation, the zoom lever ring can be used for a purpose other than the variable-speed zooming such as constant-speed zooming, switching the direction of rotation of the zoom ring, zoom limiting, and zoom presetting.

Here, the constant-speed zooming is a function of zooming at a constant speed as described above. In this case, regardless of the amount of operation (the angle of rotation) of the zoom lever ring, zooming is performed at a constant speed in a direction in which the zoom lever ring is operated.

Switching the direction of rotation of the zoom ring is a function of switching the direction of rotation of the zoom ring and a direction in which zooming is performed. In this case, for example, a direction in which the zoom lever ring is operated is set as the direction of operation in a telephoto direction. Therefore, for example, in a case where the zoom lever ring is operated in a clockwise direction, the clockwise direction of the zoom ring is set as the direction of operation in the telephoto direction. Meanwhile, in a case where the zoom lever ring is operated in a counterclockwise direction, the counterclockwise direction of the zoom ring is set as the direction of operation in the telephoto direction.

The zoom limiting is a function of limiting a zoom range. In this case, for example, operating the zoom lever ring in one direction turns on the zoom limiting function, and operating the zoom lever ring in the other direction turns off the zoom limiting function.

The zoom presetting is a function of zooming to a zoom position designated in advance at a speed designated in advance. In this case, for example, the zoom presetting function is turned on each time the zoom lever ring is operated in one direction. Note that a configuration in which two zoom positions can be preset for a case where the zoom lever ring is operated in the one direction and a case where the zoom lever ring is operated in the other direction can also be adopted.

In addition, regarding focusing functions, the zoom lever ring can be used for constant-speed focusing, focus presetting, seamless switching between continuous auto focusing (AF) and manual focusing, and the like in addition to variable-speed focusing in the above-described embodiment.

Here, the constant-speed focusing is a function of focusing at a constant speed (a function of moving a focal position at the constant speed). In this case, focusing is performed at the constant speed regardless of the angle of rotation. That is, the focal position moves.

The focus presetting is a function of focusing on a focus position designated in advance at a speed designated in advance. In this case, for example, the focus presetting function is turned on each time the zoom lever ring is operated in one direction. Note that a configuration in which two focus positions can be preset for a case where the zoom lever ring is operated in the one direction and a case where the zoom lever ring is operated in the other direction can also be adopted.

The seamless switching between continuous AF and manual focusing is a function of seamlessly switching between continuous AF and manual focusing. In this case, in a case where the zoom lever ring is operated during the continuous AF, the zoom lever ring causes a seamless transition into a manual focusing operation from the continuous AF.

Note that the interchangeable lens may be controlled by a processor (for example, a lens microcomputer) provided in the interchangeable lens or by a processor (for example, a camera microcomputer) in the camera body to which the interchangeable lens is mounted. The control of the interchangeable lens includes focus control, zoom control, stop control, and the like.

Other Embodiments

In the above-described embodiment, a case where the present invention is applied to an interchangeable lens of an interchangeable lens camera has been described as an example. However, the application of the present invention is not limited thereto. The present invention can also be applied to a lens device of a camera (a so-called lens-integrated camera) in which the lens device is integrally assembled with the camera body.

In addition, the type of camera in which the lens device is used is not particularly limited. The lens device can be used for various kinds of cameras such as a television camera, a cine-camera, and a video camera. Furthermore, the lens device can be used for purposes other than cameras.

Explanation of References

1: Interchangeable lens
10: Lens barrel
11: Mount
12: Focus ring
13: Zoom ring
14: Zoom lever ring
14L: Protrusion portion
14Ls: Inclined surface
14R: Protrusion portion
14Rs: Inclined surface
15: Button operation unit
15A: Projecting portion
15As: Inclined surface
16: Switching button
17: Zoom button
17T: Zoom telephoto button
17W: Zoom wide-angle button
20: Lens barrel main body
21: Inner tube
22: Outer tube
23: First lens frame
24: Second lens frame
25: Guide shaft
26: Zoom motor
27: Lead screw
28: Nut
29: Third lens frame
30: Fourth lens frame
31: Main shaft
32: Sub shaft
33: Fifth lens frame
40: Exterior body
41: Front cover
42: Middle cover
42A: Fixation ring portion
43: Rear cover
50: Pressure applying unit
51: Base frame
51A: Through-hole
51B: Spring fitting portion
52: Guide rail
53: Slider
53A: Spring fitting portion
54: Cam pin
55: Spring
60: Pressure applying unit attachment portion
60A: Screw hole
61: Screw
62: Cam groove
62A: Introduction portion of cam groove
62B: Lead portion of cam groove
64: Rotation detection unit
L1: First lens group
L2: Second lens group
L3: Third lens group
L4: Fourth lens group
L5: Fifth lens group
S: Stop
SU: Stop unit
Z: Optical axis

What is claimed is:

1. A lens device comprising:
a lens barrel;
a first operation ring that is provided on an outer periphery of the lens barrel and that is rotationally operated along a circumferential direction of the lens barrel; and
a structure that generates, with respect to the first operation ring, a force in a direction opposite to a direction in which the first operation ring is operated, wherein the structure includes a cam pin that is supported to be movable along an optical axis direction and fitted into a cam groove provided at the first operation ring, and a spring that biases the cam pin in the optical axis direction,
wherein the first operation ring and the structure are disposed closer to an image side than a position of a stop disposed in the lens barrel.

2. The lens device according to claim 1,
wherein the first operation ring is rotationally operated within a specific angular range.

3. The lens device according to claim 1,
wherein the structure causes the first operation ring to automatically return to a specific position.

4. The lens device according to claim 1,
wherein the structure is disposed at a plurality of positions in the circumferential direction.

5. The lens device according to claim 4,
wherein the force of the structure that acts on the first operation ring is adjustable at at least one position.

6. The lens device according to claim 1,
wherein the structure is disposed between the lens barrel and the first operation ring.

7. The lens device according to claim 1,
wherein the structure includes at least a pair of springs that biases the cam pin in opposite directions with the cam pin interposed between the springs.

8. The lens device according to claim 1,
wherein the structure includes a base member that is attachably and detachably attached to the lens barrel,
the cam pin is movably supported by the base member, and
the spring is held at the base member.

9. The lens device according to claim 1,
wherein the structure is disposed radially outside a lens that is disposed closer to the image side than the position of the stop, and
the structure is disposed radially inside the first operation ring.

10. The lens device according to claim 1,
wherein the lens barrel includes
a first lens barrel that holds a lens, and
a second lens barrel that holds the first lens barrel, and
the first operation ring and the structure are provided on the second lens barrel.

11. The lens device according to claim 1,
wherein the lens barrel includes a plurality of operation rings including the first operation ring on the outer periphery of the lens barrel,
at least one of a zoom ring, a focus ring, or a stop ring is provided as the operation ring other than the first operation ring, and
the first operation ring has a smallest diameter out of the plurality of operation rings.

12. The lens device according to claim 11,
wherein the first operation ring is disposed closest to the image side out of the plurality of operation rings.

13. The lens device according to claim 1,
wherein the lens barrel includes a first projecting portion that is arc-shaped and that extends along the circumferential direction on at least a portion of the outer periphery of the lens barrel, and
the first operation ring is disposed to be adjacent to the first projecting portion.

14. The lens device according to claim 13,
wherein a height of the first projecting portion of the lens barrel in an outer diameter direction of the lens barrel is relatively larger than a height of the first operation ring.

15. The lens device according to claim 13,
wherein the first projecting portion includes an operation member for settings related to the first operation ring and is disposed closer to the image side than the first operation ring.

16. The lens device according to claim 1,
wherein the first operation ring includes a second projecting portion that is arc-shaped and that extends along the circumferential direction on at least a portion of the outer periphery of the first operation ring.

17. The lens device according to claim 16,
wherein the first operation ring includes the second projecting portion that is arc-shaped and that extends along the circumferential direction on a portion of the outer periphery of the first operation ring, and
the second projecting portion is disposed at a position different from a position of the structure in the circumferential direction.

18. The lens device according to claim 1,
wherein the first operation ring is used for an operation related to zooming.

19. The lens device according to claim 1, further comprising:
a mount on an end portion of the lens barrel that is on the image side.

* * * * *